(12) United States Patent
Ghessassi

(10) Patent No.: US 11,758,202 B2
(45) Date of Patent: Sep. 12, 2023

(54) CONTENT DISTRIBUTION AND MOBILE WIRELESS MESH NETWORKS

(71) Applicant: CHARTER COMMUNICATIONS OPERATING, LLC, Saint Louis, MO (US)

(72) Inventor: Karim Ghessassi, Parker, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

(21) Appl. No.: 16/525,483

(22) Filed: Jul. 29, 2019

(65) Prior Publication Data
US 2021/0037272 A1 Feb. 4, 2021

(51) Int. Cl.
| G06F 15/16 | (2006.01) |
| H04N 21/231 | (2011.01) |
| H04W 84/18 | (2009.01) |
| H04W 28/14 | (2009.01) |
| H04N 21/433 | (2011.01) |
| H04L 67/568 | (2022.01) |

(52) U.S. Cl.
CPC ..... *H04N 21/23106* (2013.01); *H04L 67/568* (2022.05); *H04N 21/4331* (2013.01); *H04W 28/14* (2013.01); *H04W 84/18* (2013.01)

(58) Field of Classification Search
CPC .......... H04N 21/23106; H04N 21/4331; H04L 67/2842; H04W 84/18; H04W 28/14
See application file for complete search history.

(56) References Cited

U.S. PATENT DOCUMENTS

| 11,089,103 | B1* | 8/2021 | Parulkar | H04L 67/10 |
| 2009/0055471 | A1* | 2/2009 | Kozat | H04L 67/1063 |
| | | | | 709/203 |
| 2009/0254599 | A1* | 10/2009 | Lee | H04N 21/4147 |
| | | | | 709/201 |
| 2015/0149581 | A1* | 5/2015 | Brown | H04L 65/4069 |
| | | | | 709/217 |
| 2015/0180924 | A1* | 6/2015 | O'Callaghan | H04L 43/0829 |
| | | | | 709/219 |
| 2016/0134691 | A1* | 5/2016 | Law | H04W 4/70 |
| | | | | 370/338 |
| 2017/0054800 | A1* | 2/2017 | DiVincenzo | H04L 67/1008 |
| 2017/0230448 | A1* | 8/2017 | Liu | H04L 67/16 |
| 2019/0273800 | A1* | 9/2019 | Luft | H04L 67/2842 |

* cited by examiner

*Primary Examiner* — Padma Mundur
(74) *Attorney, Agent, or Firm* — Armis IP Law, LLC

(57) ABSTRACT

According to one configuration, a wireless base station has access to a cache (repository) that stores a stream of content including multiple segments of content. The cache stores (caches) a first segment of content from the received stream of content. The first segment of content is cached in the repository for a window of time during which the first segment of content is temporarily available from the wireless base station. In response to receiving a respective request from each mobile communication device in a group of multiple mobile communication devices requesting the first segment of content during the window of time, a wireless base station communicates the first segment of content from the cache to each mobile communication device in the group.

26 Claims, 18 Drawing Sheets

CONTENT DISTRIBUTION AND MOBILE WIRELESS MESH NETWORKS

BACKGROUND

Most video providers nowadays offer their subscribers an out-of-home option in which to retrieve video content. This is usually done through a custom mobile application, which uses either a Wi-Fi™ HotSpot or a connection through the cellular provider used by the subscriber. In most cases, a HotSpot (such as at a public location) is the preferred option in which to connect a mobile communication device to a remote network such as the Internet. The subscriber would usually incur no cost as they are retrieving their desired video content.

When a subscriber uses a transportation system such as a cab, subway, bus, airplane, etc., the connectivity options become more restrictive and costlier for both the subscriber and the transportation provider. The subscriber might have to rely on cellular connectivity to retrieve content. However, such an option would not be available onboard an aircraft. Even ground transportation such as a bus or train might not offer a HotSpot™. In such an instance, cellular (such as via LTE) connectivity might be the only option for a user to access content.

BRIEF DESCRIPTION OF EMBODIMENTS

This disclosure includes the observation that all of the above factors are a deterrent for the user to consume content provided by a service provider. The service provider might also suffer from reduced usage due to decreased advertisement revenue in addition to overall reduction in viewership.

In contrast to conventional techniques, embodiments herein provide novel ways of distributing content in a network environment.

For example, one embodiment herein includes network environment comprising: a cache management resource, a wireless base station, and multiple mobile communication devices. The cache management resource associated with the wireless base station receives a stream of content over a content feed (such as linear content, video on demand content, etc.). The stream of content includes multiple segments of content (such as playable video content). The cache management resource individually caches each of the multiple segments of content for distribution within a respective window of time. For example, the cache management resource caches a first segment of content from the received stream of content; the first segment of content is cached for a window of time during which the first segment of content is temporarily available for retrieval from the wireless base station by one or more mobile communication devices. In response to receiving a respective request from each mobile communication device in a group of multiple mobile communication devices requesting the first segment of content during the window of time, the cache management resource communicates the first segment of content for distribution to the multiple mobile communication devices in the group.

Distribution from the wireless base station to the mobile communication devices in the group can include communicating the first segment of content to a first mobile communication device that consumes the content as well as forwards a copy of the first segment of content to one or more other mobile communication devices. Alternatively, the first mobile communication device acts as a repeater in which each mobile communication device in the group communicates a respective content request for the first segment of content through the first mobile communication device to the wireless base station to retrieve the first segment of content during the window of time when the first segment of content is available.

After expiration of the window of time, the cache management resource replaces an original segment of content with a subsequently received segment of content. The cache management resource temporarily caches (for the window of time or appropriate duration) the subsequently received segment of content for retrieval by the multiple mobile communication devices. The cache management resource repeats this process of receiving and temporarily storing of content to reduce a number of individual requests from the same content over a backhaul.

In one embodiment, the group of mobile communication devices is a mobile mesh network. One or more of the mobile communication devices in the group is designated as a master node for the mesh network. The other members in the group of mobile communication devices comprising the mesh network communicate with or through master mobile communication device to retrieve segments of content of the stream of content. In one embodiment, if desired, the root node or other nodes in the mesh network can be configured to temporarily cache (store) the segment of content for retrieval by the members in the mesh network, similar to caching provided by the cache management resource associated with the wireless base station.

In one embodiment, the first mobile communication device (such as a root node of the mesh network) is in direct communication with the wireless base station over a respective wireless communication link. The first mobile communication device communicates with the wireless base station to retrieve a corresponding cached segment of content during the window of time in which the corresponding segment of content is available. The first mobile communication device plays back the corresponding segment of content on a data stream as well as operates as a server (relay or repeater) from which one or more other mobile communication devices in the mesh network request retrieval of each corresponding segment of content. In one embodiment, the cache management resource distributes a manifest file to the mobile communication devices. The manifest file indicates the segments of content available from the wireless base station.

In one embodiment, as previously discussed, the first mobile communication device (root node or master node of the mesh network) receives requests from each of the mobile communication devices in the mesh network and forwards them to the wireless base station. In this latter instance, the wireless base station retrieves the requested cached content (from cache) and communicates the requested cache content through the first mobile communication device to the requesting mobile communication device.

In still further embodiments, the window of time is a moving window of time during which the cache management resource temporarily stores a respective segment of content. In one embodiment, the cache management resource receives a second segment of content from the stream of content during the moving window of time when a first segment of content is available for retrieval; the cache management resource replaces the first segment of content stored in a cache with the received second segment of content after the second segment of content is received. The second segment of content is temporarily available for retrieval while a third segment of content is being received and buffered, and so on.

The cache repository as described herein can be configured to store any number of segments of content. In one embodiment, the cache management resource manages the cache to store two or fewer successive segments of content associated with the stream of content at any time. This reduces storage capacity needed to store many streams of content.

In yet further embodiments, the first segment of content is temporarily cached (stored in a cache repository) during the window of time until a second segment of content is received from the stream of content. The first segment of content is transmitted/received in a first timeslot of a sequence of timeslots in which the segment of content is transmitted. The second segment of content transmitted in a second timeslot (such as a next timeslot following the first timeslot) of the sequence of timeslots.

In accordance with further embodiments, the cache management resource associated with the wireless base station tunes to the stream of content in response to receiving a request for the segment of content from a first mobile communication device in the group. Communicating the first segment from the wireless base station includes: in response to receiving a first request for the first segment of content over a wireless communication link between the first mobile communication device and the wireless base station, communicating the first segment of content over the wireless communication link from the wireless base station to the first mobile communication device.

In response to receiving a second request from the first mobile communication device during the window of time for retrieval of the first segment of content, the wireless base station communicates the first segment of content from the wireless base station over the wireless communication link to the first mobile communication device, the first mobile communication device generating the second request or forwarding the request from the second mobile communication device in response to a second mobile communication device communicating a wireless message to the first mobile communication device requesting retrieval of the first segment of content from the wireless base station.

Yet further embodiments herein include, from the first mobile communication device (master or root node), communicating the first segment of content over a respective wireless communication link to the second mobile communication device. In one embodiment, the wireless base station communicates the first segment of content over the wireless communication link to the first mobile communication device in response to receiving a first request for the first segment of content over a wireless communication link between the first mobile communication device and the wireless base station. The first mobile communication device communicates the first segment of content from the first mobile communication device to the second mobile communication device in response to the second mobile communication device transmitting a wireless message to the first mobile communication device requesting the first segment of content.

In accordance with further embodiments, the wireless base station and/or cache management resource resides on a multi-passenger (moving) vehicle. Such a mobile wireless base station is in communication with a content distribution resource via a first wireless communication link; the wireless base station receives segment of contents over the first wireless communication link.

In one example embodiment, both the wireless base station and the group of mobile communication devices are operated by passengers aboard the vehicle. The group of mobile communication devices includes a first mobile communication device, a second mobile communication device, etc.

Each of the mobile communication devices is operated by a different passenger of the vehicle. For example, the first mobile communication device operated by a first passenger of the multi-passenger vehicle; the second mobile communication device operated by a second passenger of the multi-passenger vehicle; and so on.

The cache management resource associated with the wireless base station and/or vehicle communicates the first segment of content from the wireless base station on the vehicle to each of mobile communication devices in the group. This includes: i) in response to receiving a request for the first segment of content from the first mobile communication device during the window of time, communicating the first segment of content from the wireless base station to the first mobile communication device, and ii) in response to receiving a requesting for the first segment of content from the second mobile communication device during the window of time, communicating the first segment of content from the wireless base station to the second mobile communication device.

Further embodiments herein caching content at each of multiple wireless base stations in the network environment. For example, the wireless base station is a first wireless base station in a network environment. The group of mobile communication devices is a first group of mobile communication devices. The network environment includes any number of wireless base stations. In one embodiment, a second wireless base station in the network environment receives the stream of content as well. The second wireless base station and corresponding cache management resource caches each of the segments of content received from the received stream of content for a respective window of time. In response to receiving a respective request from each mobile communication device in a second group of multiple mobile communication devices requesting the first segment of content from the second wireless base station during the window of time, the second wireless base station communicates the first segment of content from the second wireless base station to each mobile communication device in the second group. Thus, temporary caching of segments of content can be performed on a large scale across multiple wireless base stations.

The second wireless base station can be configured to receive a handoff of a particular mobile communication device from a mesh network in communication with the first wireless base station. In such an instance, the particular mobile communication device is handed off to a second mesh network and retrieves the segments of content associated with the stream of content in a similar manner.

In accordance with yet further embodiments, the wireless base station includes a connection management resource. In one embodiment, the connection management resource is operable to: receive a request for access to the segment of content from a second mobile communication device; identify a set of multiple mobile communication devices, which includes the first mobile communication device, that are wirelessly connected to the wireless base station and that receive the stream of content from the wireless base station; rank the multiple mobile communication devices in the set based on an ability of the multiple mobile communication devices in the set to provide the second mobile communication device access to the wireless base station or the segments of content; and notify the second mobile communication device to communicate with or through a selected mobile communication device in the set to the wireless base station to retrieve the different segments of content.

Second Embodiments

Another embodiment herein includes a connection management resource (associated with the wireless base station) that tracks wireless connectivity amongst a group of multiple mobile communication devices in a wireless mesh network. The wireless mesh network includes at least a first mobile communication device coupling the mesh network to a wireless base station via a wireless communication link. The wireless base station receives a request from a second mobile communication device that is initially not a member of the wireless mesh network. The wireless base station notifies the second mobile communication device to connect to the wireless base station via connectivity through the wireless mesh network.

In yet further embodiments, the wireless base station receives the request from the second mobile communication device. In one embodiment, instead of establishing a new wireless communication link between the wireless base station and the second mobile communication device via a new wireless communication link, the wireless base station redirects the second mobile communication device to communicate with the wireless base station through the wireless mesh network and one or more mobile communication devices in the wireless mesh network.

In still further embodiments, the cache management resource (such as implemented on or serving a respective vehicle of multiple passengers) as described herein temporarily caches segments of content received from a received title of content. Each temporarily cached segment of content is replaced with a newly received segment of content from the received title of content. The cache management resource distributes the temporarily cached segments of content to the mobile communication devices (such as group of mobile communication devices) aboard the vehicle through the wireless base station. Each corresponding cached segment of content distributed during a respective window of time when the corresponding cached segment of content is temporarily available.

In accordance with further embodiments, the wireless communication link is a first wireless communication link, the cache management resource is further operable to: in response to detecting termination of the first wireless communication link between the first mobile communication device and the wireless base station, establish a second wireless communication link between the second mobile communication device and the wireless base station. The second mobile communication device provides the group of multiple mobile communication devices in the wireless mesh network access to the wireless base station.

Further embodiments herein include reassigning a mobile communication device to be a replacement root node for a current root node (of a respective mesh network) under conditions in which the current root node (mobile communication device) is no longer in a vicinity of the wireless base station. For example, one embodiment herein includes: based on proximity of a second mobile communication device to the wireless base station, assigning the second mobile communication device as a root node connecting the mesh network of mobile communication devices to the wireless base station; and providing notification to the second mobile communication device and mobile communication devices in the mesh network that the second mobile communication device is designated as the root node of the mesh network. The second mobile communication device then provides member mobile communication devices in the mesh network access to the wireless base station or retrieved segments of content instead of the original root node.

Embodiments herein are useful over conventional techniques. For example, the cache management resource and system as described herein offloads connectivity of mobile communication devices from a wireless base station to a mobile mesh network that provides access to segments of content temporarily cached in a repository associated with the with wireless base station. Rather than fetching a same segment of content over and over again for each of multiple mobile communication devices from a backhaul link, the segment of content is temporarily cached for a window of time form a wireless base station or one or more mobile communication devices in the wireless mesh network so that other devices are able to retrieve it.

Embodiments herein can be implemented in any suitable application. By way of non-limiting example embodiments, applications include:

Offering video service to a large number of users without having to upgrade the infrastructure.

Implementing the novel wireless techniques as described herein in high-density areas, resulting in lower bandwidth usage.

Enabling a service provider the ability to provide users access to content in challenging environments such as airplanes, trains, buses, etc.

A service provider can maintain systems with fixed capacity regardless of usage.

For transportation systems (such as trains, etc.) with intermittent connectivity, providing wireless base station and corresponding caching on the vehicle provides increased caching capacity, more efficient use of wireless resources, and fewer wireless communication interruptions.

Embodiments herein include a video delivery system for content (such as linear, video on demand, etc.) provided by a Cable company, or other media company offering comparable service. The end user would be a subscriber in an out of home transportation system such as: automobiles, train or airplane. Cellular/satellite connectivity would be attached to the transportation system for connecting to cellular tower as well as Wi-Fi for establishing peer-to-peer connections with similar systems. A computer real-time storage system would be available on the transportation system, on the cellular tower or any physically attached system. Embodiments herein reduce the overall bandwidth used on the cellular network.

Note that any of the resources as discussed herein can include one or more computerized devices, wireless stations, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein. Accordingly, embodiments herein are directed to a method, system, computer program product, etc., that supports operations as discussed herein.

One embodiment includes a computer readable storage medium and/or system having instructions stored thereon. The instructions, when executed by computer processor hardware, cause the computer processor hardware (such as one or more co-located or disparately processor devices) to: receive a stream of content at a wireless base station, the stream of content including multiple segments of content; cache a first segment of content from the received stream of content, the first segment of content cached for a window of time during which the first segment of content is temporarily available from the wireless base station; and in response to receiving a respective request from each mobile communication device in a group of multiple mobile communication devices requesting the first segment of content during the window of time, communicate the first segment of content to each mobile communication device in the group.

Another embodiment includes a computer readable storage medium and/or system having instructions stored thereon. The instructions, when executed by computer processor hardware, cause the computer processor hardware (such as one or more co-located or disparately processor devices) to: track wireless connectivity amongst a group of multiple mobile communication devices in a wireless mesh network, the wireless mesh network including a first mobile communication device coupling the mesh network to a wireless base station via a wireless communication link; receive a request from a second mobile communication device, the second mobile communication device initially not part of the wireless mesh network; and notify the second mobile communication device to connect to the wireless base station via connectivity through the wireless mesh network.

The ordering of the steps above has been added for clarity sake. Note that any of the processing steps as discussed herein can be performed in any suitable order. Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of distributing content. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
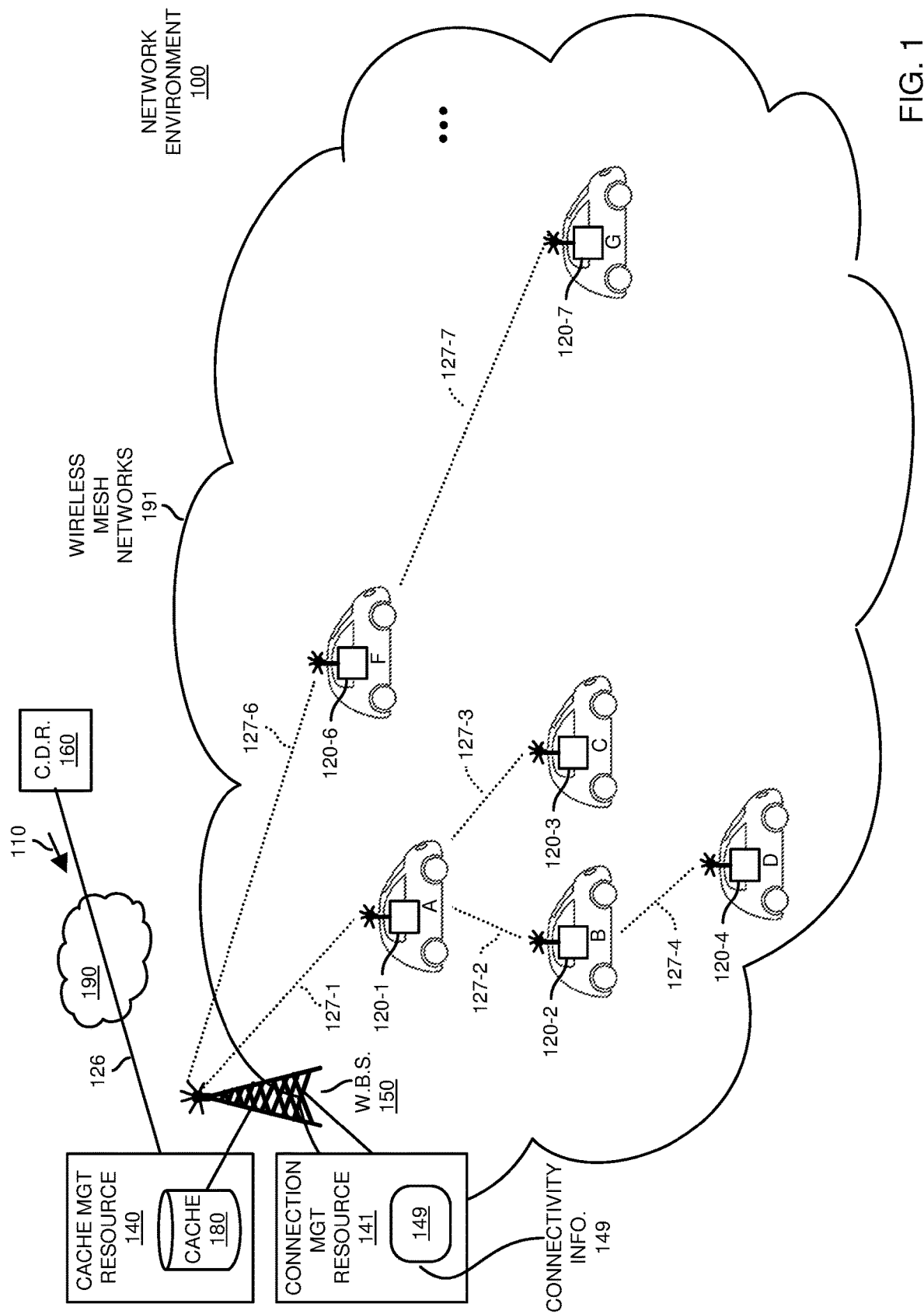
FIG. 1 is an example diagram illustrating a wireless network environment and wireless mesh network connectivity according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein provide efficient delivery of video to users in a network environment outside of their home such as in a transportation system. It is desirable to provide smooth and reliable delivery of content while using as little bandwidth as possible from cellular/satellite network which generally has less capacity than in-home connectivity.

The proposed systems as described herein are built around transient caching of linear video segments at a set time and space. As the video is streamed to a distribution node such as a wireless base station, each client requests a respective segment of content at a set interval. Caching as described herein is achieved via a limited storage capacity that stores segments only for specific streams until the segments are no longer needed. In one example embodiment, this means, if there were 10 channels being streamed, the cache repository as described herein would only store 10 segments (one segment for each channel) at any given time. The cache would continuously pre-cache any subsequent segment based on availability and used logic.

The storage capacity of the cache repository dictates how many channels can be handled at any given moment. If the number of channels exceeds the capacity, then only the channels with the most clients would be cached.

As further discussed herein, the communication system can be configured to implement one or more levels of caching:

Level 1: This would be located on the cellular tower (wireless base station), which would have backhaul connectivity to a CDN (Content Delivery Network) or a similar system. The caching system at the tower would serve segments in the cache or act like a proxy; that is, it would allow the connection to go through directly to the end point (standard approach).

Level 2: This would be the Mesh network that will consist of moving vehicles. In one embodiment, each vehicle is equipped with an adHoc Wi-Fi system that acts as both an Access Point and Client. For example, vehicles which are equipped with the proper hardware would always have a refreshed list of vehicles nearby as well as which video streams are being used. When a user in vehicle A selects a video stream such as VS-1, the onboard system (mobile communication device providing client-server capability) would first look up any registered vehicle, which is using that stream at the same time. A request is then made through a wireless link to mobile communication device in the registered vehicle to download segments for VS-1. Should the mobile communication device in the vehicle lose the wireless connection, it would then look up the next 'best' source based on proximity (using GPS) and possible QoS parameters. If no vehicle is available with the next appropriate segment to be consumed by the requestor, then a connection is made directly to the cellular tower (wireless base station temporarily caching the segments of content) when Level 1 is implemented.

Level 3: This level of caching would primarily be used on transportation vehicles with more than one user. This would include environments such as shared mobility cars, buses, trains, aircraft, etc. A caching and corresponding content distribution system would be installed on the vehicle itself. Users on the vehicle accessing a respective video service would have their client first attempt to connect to the local cache server through Wi-Fi or cellular (LTE) connectivity. The same approach listed above would be used. For example, if the requested segment is not found in the cache system on the vehicle, then the server would act as a proxy to nearest tower implementing Level 1 caching as previously discussed. Alternatively, the cache management resource serving multiple mobile communication devices on the multi-passenger vehicle can be configured to communicate with another mobile communication device coupled to a wireless base station that caches the requested content.

Bandwidth Usage Reduction

The different levels of transient caching as described herein reduce the duplicative nature of video Internet traffic (data packets), which would be associated with multiple users using the same video stream (watching the same channel).

Level 1 caching and content distribution as described herein would require the same number of connections as with conventional technology, but offers the opportunity of dramatically reducing the number of backhaul connections to the CDN as there are only a set number of channels regardless of the number of users.

Level 2 caching and corresponding content distribution as described herein offers even more optimizations as the number of cellular connections is greatly reduced as the number of cars in the Mesh Network is increased. This would be ideal within cities with higher car density.

Level 3 caching and corresponding content distribution as described herein offers the most optimum solution as all users within the vehicle (especially airplanes) are routed through a single caching server, which would only make a single connection per stream. This would be to a Cellular or satellite source. In the case of video service onboard aircraft, it would be ideal to offer a smaller number of channels, which would allow for a fixed number of connections, which would be made to the source. This may be particularly useful since the cost of satellite connectivity is higher.

Connection to Mesh Network

When a mobile communication device in a vehicle requests to receive a segment of content, embodiments herein include implementing the following operations:

1. The initial request is made to the Cell Tower Control System (CTCS), which fetches the appropriate segment from a back-end resource. A cache management resource temporarily stores each segment of content.

2. The CTCS determines if there are any nearby vehicles that are operating as 'master' which are streaming the same content requested by the mobile communication device in the vehicle. It then determines which mobile communication device (or vehicle) is the closest and is a good candidate for mesh connection such as vehicles A, B and C.

3. If a plausible candidate mobile communication device and corresponding vehicle is determined, the new mobile communication device establishes a direct connection to the master mobile communication device and then is labeled a 'slave' mobile communication device. If this is not possible, the new mobile communication device and corresponding vehicle is registered as 'master' with the CTCS.

4. At any given stage (because the vehicles are moving), the system might change which mobile communication device in a respective vehicle is promoted to 'master' or demoted to 'slave' based on proximity to the CTCS.

Connections within Multi-Passenger Vehicle

This case covers vehicles, which can have more than one passenger in taxis, buses, airplanes, etc. In these systems, it is assumed passengers are using different video streams. In these vehicles, we have a local control system (LCS) disposed in the vehicle. When a connection is made from a video client, the following steps are taken:

1. A request is made for a specific segment/video to the LCS in the vehicle using Wi-Fi.

2. If the LCS in the vehicle has the segment cached locally, it is then served back to the client. Otherwise, it is fetched from the external network (Cellular or Satellite). The segment is then stored locally and other segments belonging to the same stream are purged.

The system guarantees that each video stream will not exceed one external fetch connection regardless of how many users are connected within the vehicle.

Targeted Advertising and Privacy

The system as described herein (which implements one or more caching levels) includes a caching computer to manage connections and storage. Such a computer (or computers) can be fitted with a location sensing device (such as GPS) so it can determine its location in real-time. Such information can be 'enriched' with video connection requests for the segments. This means, all video streams conveyed through the system to respective mobile communication devices can be tagged with location information. It should be noted this is not tied to any GPS-enabled device the actual user is using to consume the content (phone, tablet, etc.). This means users can watch video content on their devices even with their GPS turned off. The location information indicating a location of the multi-passenger vehicle is sent back to the servers and is used to serve location-based targeted advertisement back to the cache management resource on the multi-passenger vehicle. No personalized information associated with the users streaming the content is included as the location information is coming from the caching server (cache management resource) instead of the mobile communication devices. In one embodiment, advertisement is always targeting the transportation vehicle but not the user; this type of advertisement would not be available once the user exits the vehicle.

Now, more specifically, FIG. 1 is an example diagram illustrating a wireless network environment and distribution of content according to embodiments herein.

As shown, the network environment 100 includes content distribution resource 160, network 190, cache management resource 140, connection management resource 141, wireless base station 150, wireless base station 151, wireless mesh network 191, and wireless mesh network 192.

Cache management resource 140 includes cache repository 180 to store segments of content received from the content distribution resource 160 and redistributed to the mobile communication devices 120.

Connection management resource 141 produces connectivity information 149, which tracks locations of mobile communication devices in wireless mesh network 191.

In this example embodiment, each of the mobile communication devices 120 in network environment 100 is in wireless communication with the wireless base station 150 via a direct wireless communication link or via a wireless communication link through another mobile communication device.

More specifically, in this example embodiment, the mobile communication device 120-1 operated by a user in vehicle A is in communication with the wireless base station 150 over wireless communication link 127-1; the mobile communication device 120-2 operated by a user in vehicle B is in communication with the mobile communication device 120-1 over wireless communication link 127-2; the mobile communication device 120-3 operated by a user in vehicle C is in communication with the mobile communication device 120-1 over wireless communication link 127-3; the mobile communication device 120-4 operated by a user in vehicle D is in communication with the mobile communication device 120-2 over wireless communication link 127-4.

Note that each of the vehicle in network environment 100 may be stationary or in motion.

In one embodiment, a respective one or more intermediate mobile communication devices in a path between a mobile communication device and the wireless base station 150 serves as both a client and server. For example, the mobile communication device 120-1 operates as client with respect to the wireless base station 150 (server). Mobile communication device 120-1 operates as a server with respect to the mobile communication device 120-2 and mobile communication device 120-3. That is, mobile communication device 120-1 serves to communicate data packets received from wireless base station 150 downstream to the mobile communication devices 120-2 and 120-3.

As a further example of operation, assume that the mobile communication device 120-1 receives a request (for a segment of content) from mobile communication device 120-2. Mobile communication device 120-1 either communicates (serves) the requested segment of content to the mobile communication device 120-2 (as it may have the requested segment of content temporarily cached based on a prior request from the mobile communication device 120-1 to the wireless base station 150) or the mobile communication device 120-1 communicates the request from the mobile communication device 120-2 upstream to the wireless base station 150. In this latter instance, the mobile communication device 120-1 receives the requested segment of content and forwards it to the mobile communication device 120-2. Thus, the mobile communication device 120-1 can be a repeater device that relays messages upstream and downstream.

Each of the mobile communication devices in the wireless mesh network operate in a similar manner (such as a client only, client/server, pass-through repeater, etc.).

Embodiments herein include novel ways of temporary caching data for distribution in a wireless mesh network 191.

For example, in one embodiment, the cache management resource 140 associated with the wireless base station 150 receives a stream of content 110 over a content feed providing content such as linear content, video on demand content, etc. The cache management resource 140 can be configured to automatically tune to multiple streams of content and temporarily store different segments of content. Alternatively, the cache management resource 140 can be configured to temporarily store segments of content associated with streams of content requested by the mobile communication devices 120.

As further discussed herein, the stream of content 110 includes multiple segments of content (such as playable video content). The cache management resource 140 temporarily caches each of the multiple segments of content in cache repository 180 for distribution within a respective window of time.

More specifically, in one embodiment, the cache management resource 120 caches a first segment of content from the received stream of content 110; the first segment of content is cached for a window of time during which the first segment of content 110 is temporarily available for retrieval from the wireless base station 150. In response to receiving a respective request from each mobile communication device in a group of multiple mobile communication devices requesting the first segment of content during the window of time, the wireless base station 150 communicates the first segment of content from the wireless base station 150 to each mobile communication device in the group.

As previously discussed, a respective mobile communication device can be configured to temporarily store a received segment of content for further distribution to a downstream mobile communication devices requesting the segment of content. If the segment of content is not available from an intermediate mobile communication device, the intermediate mobile communication device communicates the request further upstream as previously discussed.

After expiration of the window of time, the cache management resource 140 replaces an original segment of content with a subsequently received segment of content. Thus, the cache management resource 140 temporarily caches (for a window of time) the subsequently received segment of content for retrieval by the multiple mobile communication devices. The cache management resource repeats this process of receiving and temporarily storing of content to reduce a number of individual requests from the same content over a backhaul link (such as communication link 126) to the content distribution resource 160.

As previously discussed, the wireless base station 150 includes a connection management resource 141. As its name suggests, and as further discussed below, the connection management resource 141 manages connections (connectivity) amongst the multiple mobile communication devices 120 in network environment 100 and formation of different wireless mesh networks.

Figure 2:
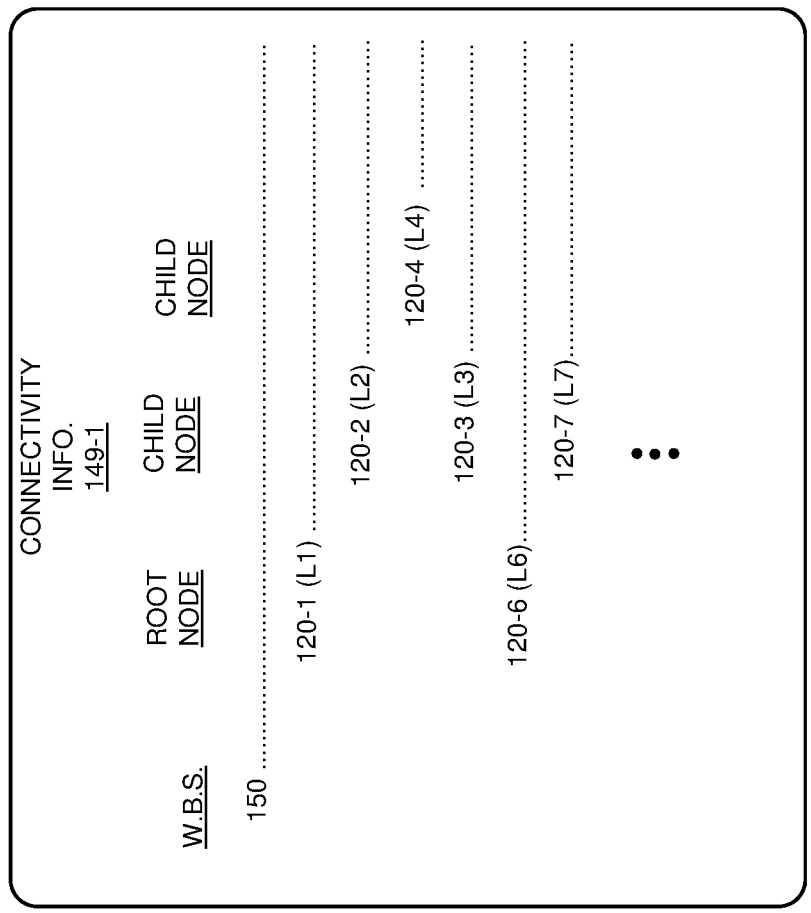
FIG. 2 is an example diagram illustrating connectivity information according to embodiments herein.

FIG. 2 is an example diagram illustrating connectivity information according to embodiments herein.

In this example embodiment, the connection management resource 141 produces the connectivity information 149-1 to reflect the current status of wireless mesh networks 191 as shown in FIG. 1. The hierarchy as specified by the connectivity information 149-1 indicates that both root node mobile communication device 120-1 and mobile communication device 120-6 are each in direct communication with the wireless base station 150 over a respective wireless communication link.

Connectivity information 149-1 further indicates that the mobile communication devices 120-2 and 120-3 are both wirelessly connected to the mobile communication device 120-1. Connectivity information 149-1 indicates that the mobile communication device 120-4 is wirelessly connected to the mobile communication device 120-2 in the hierarchy.

Connectivity information 149-1 also indicates that the mobile communication device 120-7 is wirelessly connected to the mobile communication device 120-6.

In accordance with further embodiments, the connection management resource tracks a current location (such as latitude and longitude, value L) of each of the mobile communication devices 120 (and corresponding vehicles) over time.

Determination of the current location can be achieved in any suitable manner. For example, in one embodiment, each of the mobile communication devices communicates its location information (such as based on GPS information) to the wireless base station 150 every minute (or other suitable time frame).

In this example embodiment, based on information received from each of the mobile communication devices, the connectivity information 149-1 indicates that mobile communication device is currently at a location as specified by value L1; mobile communication device 120-2 is currently at location as specified by value L2; mobile communication device 120-4 is currently at location as specified by value L4; mobile communication device 120-3 is currently at a location as specified by value L3: mobile communication device 120-6 is currently at a location as specified by value L6; and mobile communication device 120-7 is currently at a location as specified by value L7; and so on.

In this manner, the network connectivity information 149-1 tracks connectivity between mobile communication devices as well as corresponding locations of the mobile communication devices in the wireless mesh network 191.

Figure 3:
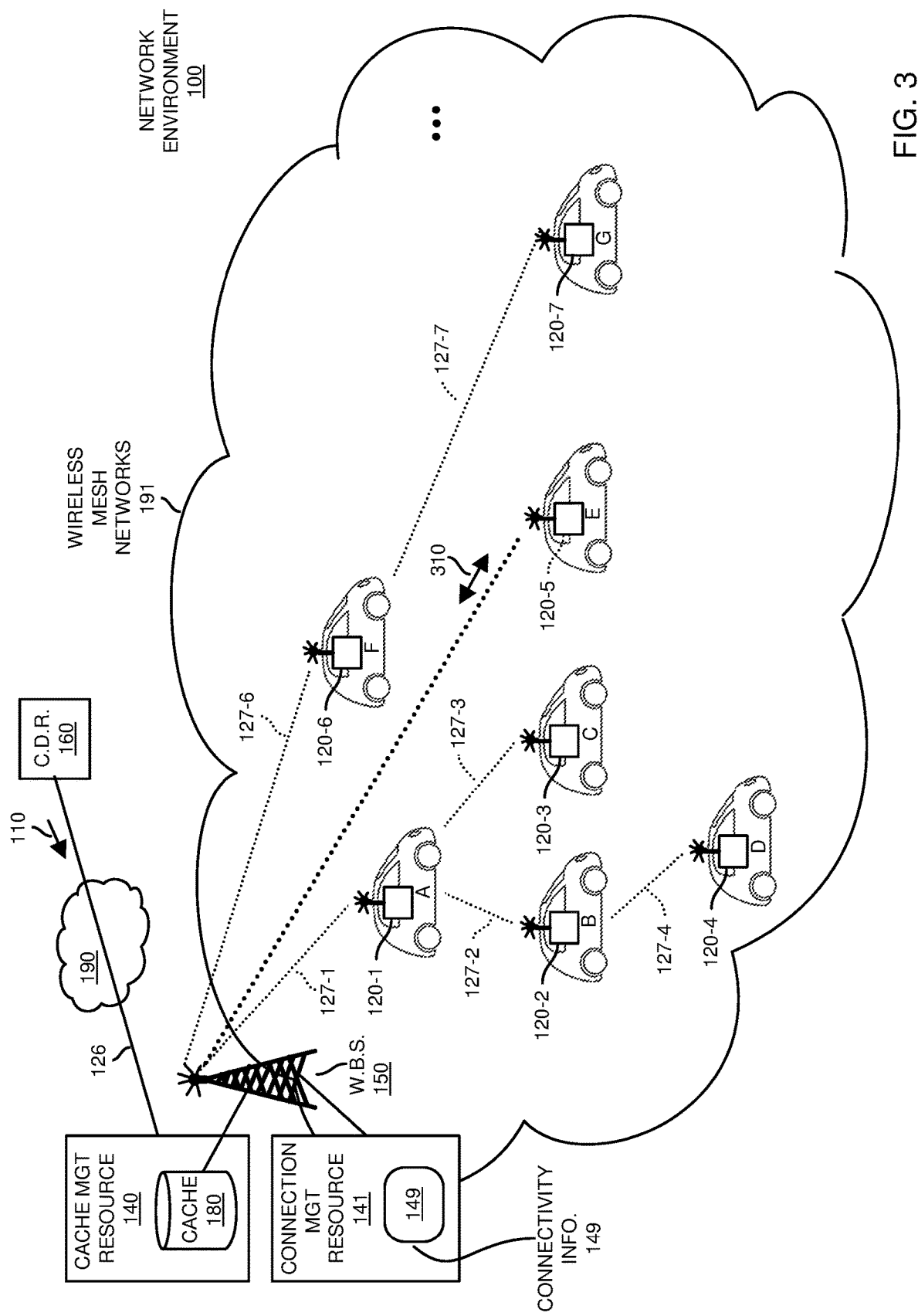
FIG. 3 is an example diagram illustrating a mobile communication device requesting content according to embodiments herein.

FIG. 3 is an example diagram illustrating a mobile communication device requesting content according to embodiments herein.

As shown in this example embodiment, the mobile communication device 120-5 operated by a respective user in vehicle E attempts to connect to wireless base station 150 and then retrieve segments from a specific segment of content from the wireless base station 150.

Initially, via communications 310, the mobile communication device 120-5 and the wireless base station 150 communicate with each other. Assume in this example embodiment that the mobile communication device 120-5 notifies the wireless base station 150 of a respective title of content that the corresponding user would like to play back on the mobile communication device 120-5.

In one embodiment, the connection management resource 141 processes the received request (from the mobile communication device 120-5 in vehicle E) and (using connectivity information 149) identifies an appropriate one or more wireless mesh networks that exist in the network environment 100. In one embodiment, each of the mobile communication devices in the wireless mesh network including mobile communication devices 120-1, 120-2, 120-3, and 120-4 retrieves segments of content from the same stream of content 110. Any new mobile communication device wishing to retrieve the segment of content may join this wireless mesh network if they are in a vicinity of any of the wirelessly interconnected mobile communication devices.

In alternative embodiments, each of the mobile communication devices in a respective wireless mesh network is able to retrieve segments of content from a different video stream.

In response to receiving the request for content 110 from mobile communication device 120-5 in vehicle E, the connection management resource 141 communicates all or a portion of connectivity information 149-1 (such as identity of the mobile communication device and its respective location) to the mobile communication device 120-5.

The mobile communication device 120-5 then process the connectivity information 149-1 to identify which of the mobile communication devices in a respective wireless mesh network provide wireless connectivity to the wireless base station 150.

Alternatively, the mobile communication device 120-5 communicates its location to the connection management resource 141. The connection management resource 141 notifies the mobile communication device 120-5 of the one or more nearest or best candidate mobile communication devices providing access to the wireless base station 150.

Figure 4:
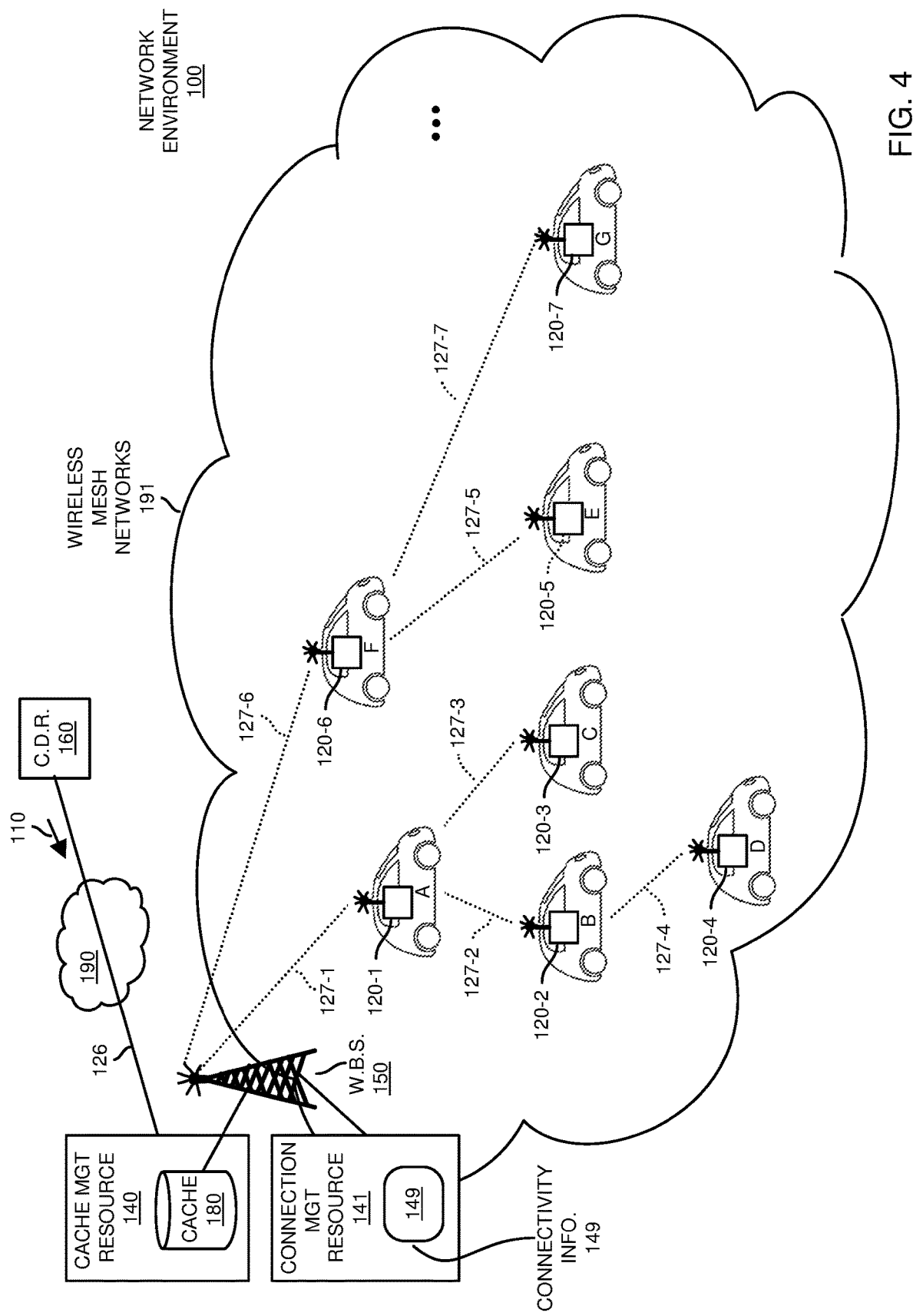
FIG. 4 is an example diagram illustrating a mobile communication device redirected to a mesh network according to embodiments herein.

In this example embodiment, assume that the connection management resource 141 determines and then notifies the communication device 120-5 that the best suited node to provide connectivity to the wireless base station 150 is mobile communication device 120-6. In such an instance, the mobile communication device establishes a wireless communication link 127-5 between the mobile communication device 120-5 and the mobile communication device 120-6 as shown in FIG. 4. Connectivity 127-5 of the mobile communication device 120-5 to the mobile communication device 120-6 is further shown in FIG. 4.

FIG. 4 is an example diagram illustrating redirection of a mobile communication device to a mesh network according to embodiments herein.

As shown in this example embodiment, the mobile communication device 120-5 establishes a respective wireless communication link 127-5 between the mobile communication device 120-5 and the mobile communication device 120-6.

Figure 5:
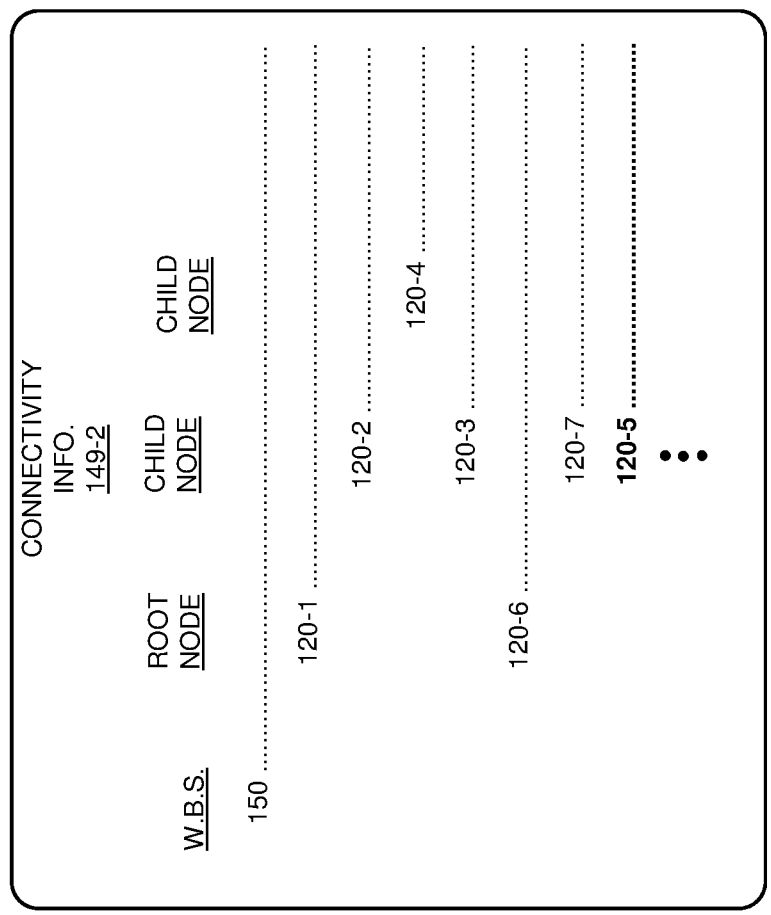
FIG. 5 is an example diagram illustrating updated connectivity information according to embodiments herein.

Based on this new wireless connectivity, the connection management resource 141 updates the connectivity information 149-1 to connectivity information 149-2 as further shown in FIG. 5.

FIG. 5 is an example diagram illustrating updated connectivity information according to embodiments herein.

Based on the new connectivity between the mobile communication device 120-5 and the mobile communication device 126, the connection management resource 141 produces the connectivity information 149-2. Accordingly, the connectivity information 149-2 indicates that the mobile communication device 120-5 in the vehicle E is coupled to wireless base station 150 through the mobile communication device 120-6. In a manner as previously discussed, the connectivity information 149-2 can be continuously updated to indicate a current location of each of the mobile communication devices in the network environment 100.

Figure 6:
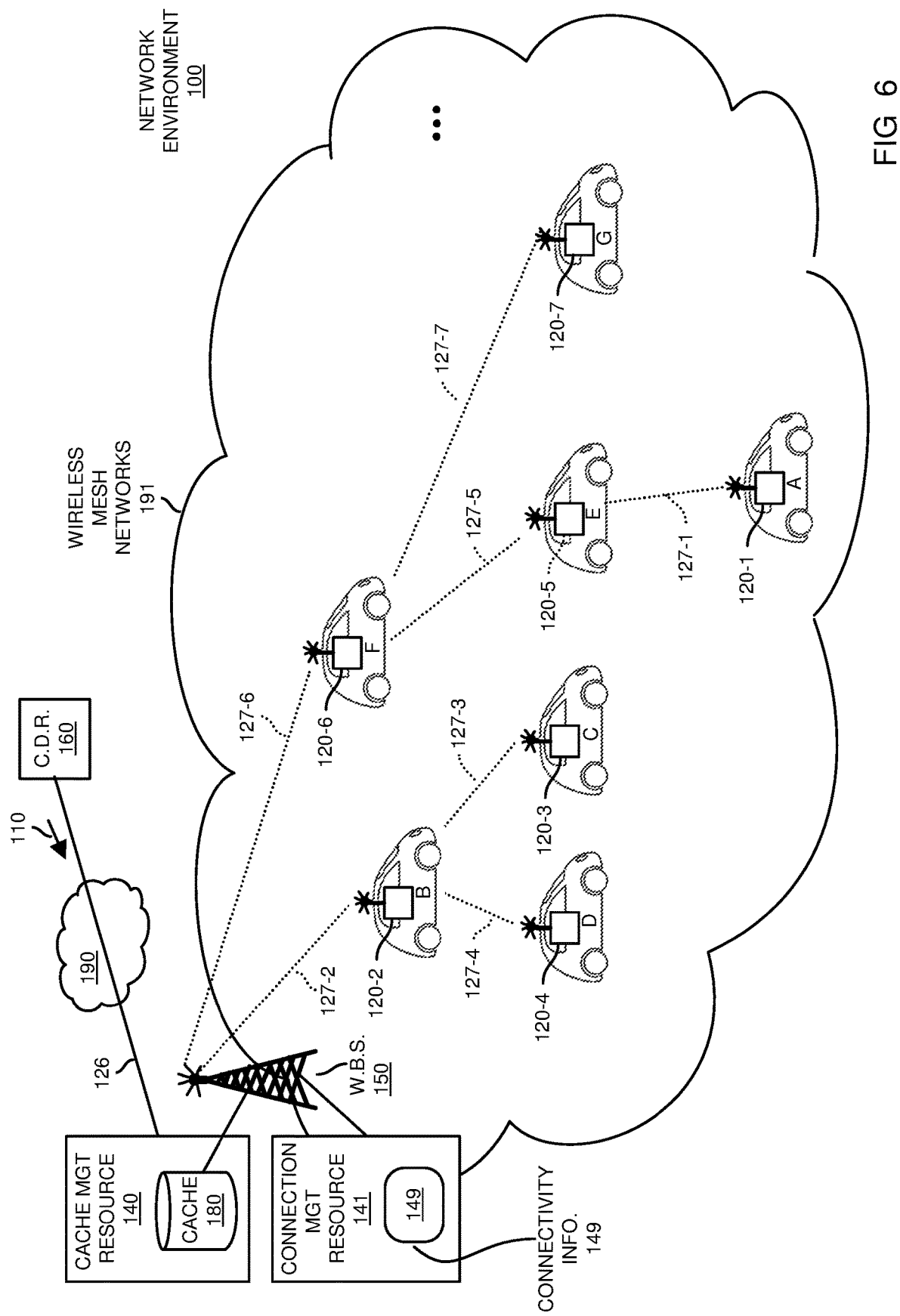
FIG. 6 is an example diagram illustrating reassignment of a mobile communication device to be a root node according to embodiments herein.

FIG. 6 is an example diagram illustrating reassignment of a mobile communication device to a root node according to embodiments herein.

In this example embodiment of FIG. 6, assume that the vehicle A moves to a new location and no longer has a good wireless connection with the wireless base station 150. This can be determined in any suitable manner.

For example, in one embodiment, the wireless base station 150 and/or the mobile communication device 120-2 continuously monitor a wireless power level of communications received from each other. In response to detecting that the power level of received communications falls below a threshold value, the connection management resource 141 adjusts connectivity of the wireless mesh network such that the mobile communication device 120-2 is now promoted to the root node in connection with the wireless base station 150 over wireless communication link 127-2. Mobile communication devices 120-4 and 120-3 are still wirelessly connected to mobile communication device 120-2. Mobile communication device 120-2 either serves its own temporarily stored segments of content to the mobile communication devices 120-3 and 120-4 or retrieves requested segments of content from the wireless base station 150 on behalf of the mobile communication devices 120-3 and 120-4 and then forwards the requested segments of content to the mobile communication devices 120-3 and 120-4.

Based on the location of mobile communication device 120-1 away from the wireless base station 150, the connection management resource 141 notifies the mobile communication device 120-1 to connect to the mobile communication device 120-5. This reconfigures the wireless mesh networks 191 in a manner as shown in FIG. 6.

Figure 7:
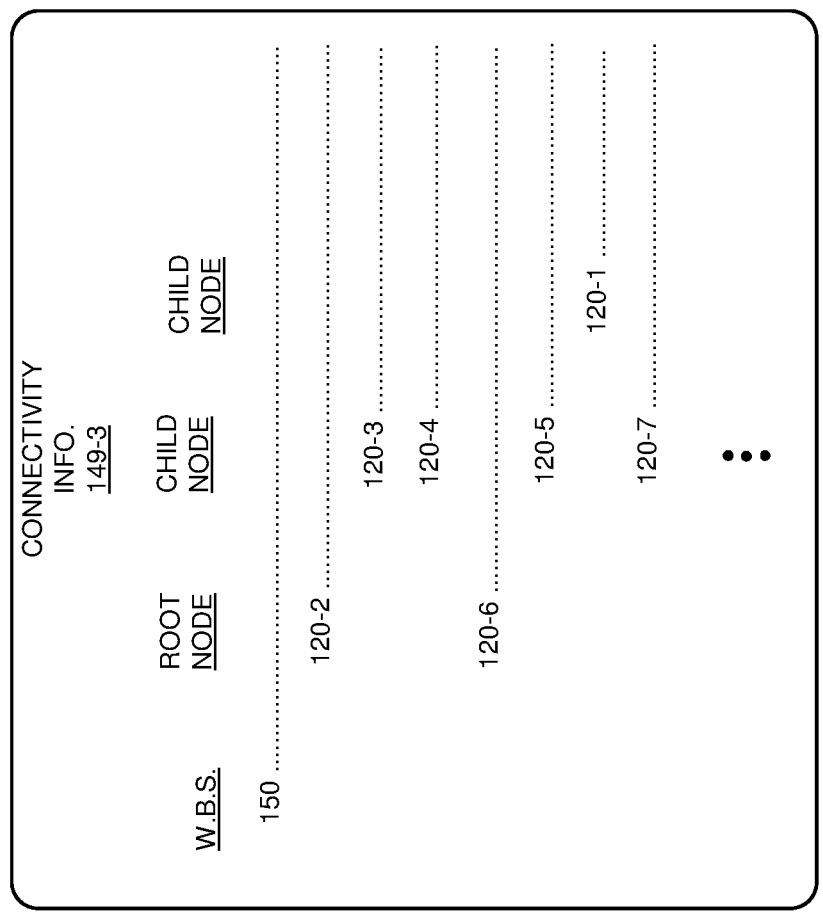
FIG. 7 is an example diagram illustrating updated connectivity information according to embodiments herein.

The connection management resource 141 then updates the connectivity information 149-3 is shown in FIG. 7 to indicate that the mobile communication device 120-1 is now wirelessly connected to the mobile communication device 120-5.

As previously discussed, the connection management resource 141 continuously monitors the ability of each of the root nodes (master mobile communication devices 120-2 and 120-6) to communicate with the wireless base station 150 as well as monitors an ability of each of the slave mobile communication devices 120-4, 120-3, etc., and their ability to communicate upstream towards the wireless base station 150. The connection management resource 141 initiates an update to connectivity of mobile communication devices in the wireless mesh network on an as-needed basis.

Figure 8:
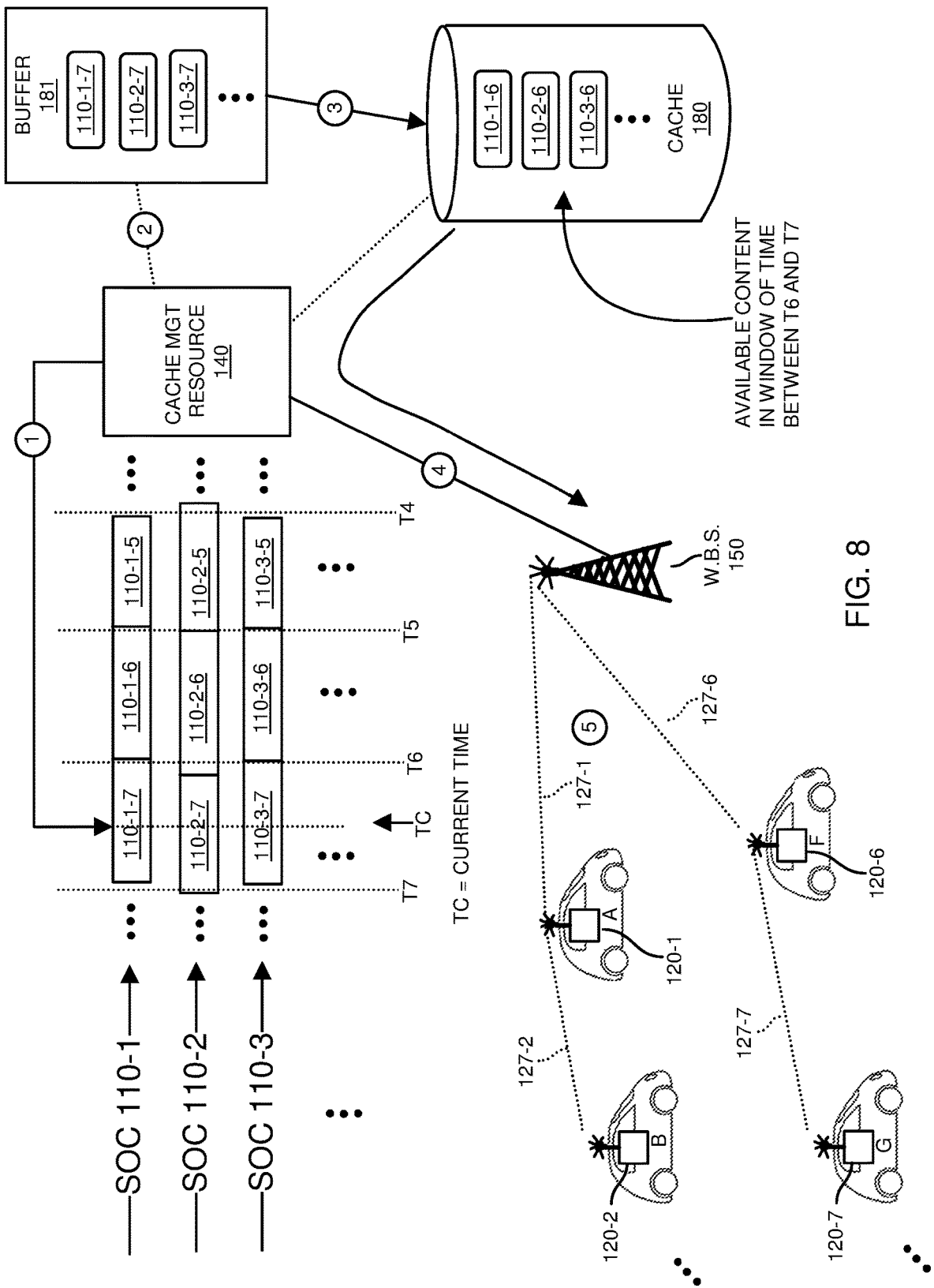
FIGS. 8-12 illustrate different techniques of caching content according to embodiments herein.

FIG. 8 is an example diagram illustrating distribution of content according to embodiments herein.

In this example embodiment, the cache management resource 140 associated with respective wireless base station 150 tunes to one or more streams of content 110-1, 110-2, 110-3, etc.

In one embodiment, each stream of content is a different title of video content received at the wireless base station 150. For example, the stream of content 110-1 is a first stream (title) of video content; the stream of content 110-2 is a second (title) stream of video content; the stream of content 110-3 is a third (title) stream the video content; and so on.

Each stream of content is encoded to include corresponding segments of content. For example, stream of content 110-1 includes segment of content 110-1-5, segment of content 110-1-6, segment of content 110-1-7, etc. Cache management resource 140 receives the segments of content in a sequence as shown over time. For example, the cache management resource 140 receives segment of content 110-1-5, followed by segment of content 110-1-6, followed by 110-1-7, and so on.

As further shown, cache management resource 140 includes buffer 181. Cache management resource 140 stores segments of content previously received between time T5 and time T6 in the buffer 181. Accordingly, buffer 181 stores newly received segments of content 110-1-7, 110-2-7, 110-3-7, etc., while the cache repository 180 stores segments of content 110-1-6, 110-2-6, 110-3-6, etc.

Cache management resource 140 temporarily stores (for a window of time) prior received segments of content in cache repository 180. Accordingly, between time T6 and T7 or some other chosen window of time, the cache management resource 140 stores segment of content 110-1-6, 110-2-6, 110-3-6, etc., in cache repository 180 for each of the different streams of content 110-1, 110-2, 110-3, etc., as shown.

In one embodiment, the cache management resource 140 makes the segments of content stored in the cache repository 180 available to the mobile communication devices in the network environment 100 during a window of time between T6 and T7. Thus, as the cache management resource 140 receives next segments of content from the different streams of content 110, the cache management resource 140 makes the prior received segments of content stored in the cache repository 180 temporarily available to the mobile communication devices until the cache management resource 140 overwrites the segments of content 110-1-6, 110-2-6, 110-3-6, etc., in the cache repository 180 with new segments of content 110-1-7, 110-2-7, 110-3-7, etc., as shown in FIG. 9.

Thus, instead of storing every segment of content associated with each of the video streams, the cache management resource 140 limits storage of the segments of content to those that are currently being received by the cache management resource 140. In one embodiment, each of the streams of content 110 are broadcast video content transmitted in a respective timeslot. The mobile communication devices consuming the corresponding segments of content retrieve and play back the content in approximately real time (with a delay) to accommodate for the caching by cache management resource 140.

Figure 9:
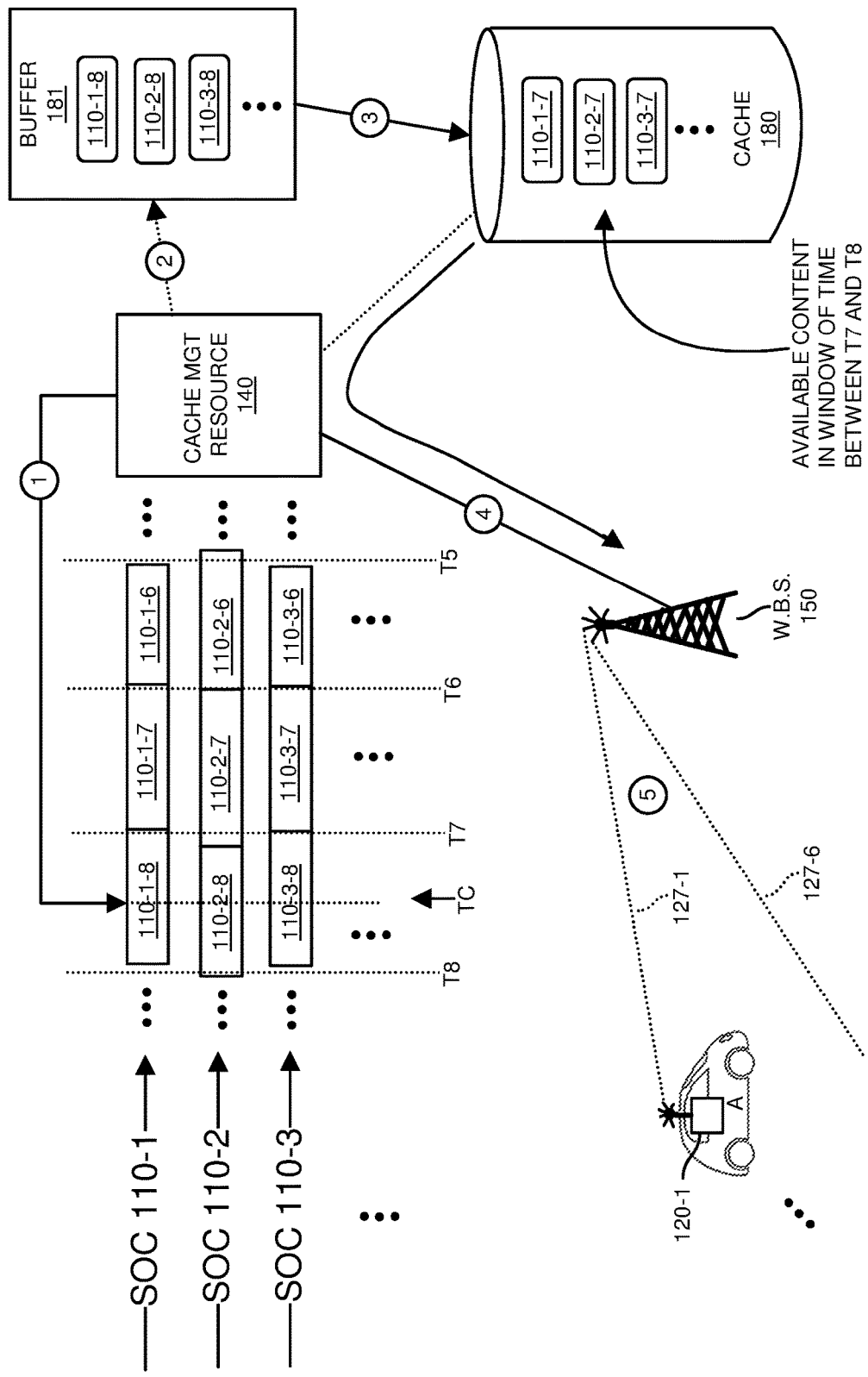

FIG. 9 is an example diagram illustrating distribution of content according to embodiments herein.

In this example embodiment, the cache management resource 140 associated with the wireless base station 150 continues to tune to one or more streams of content 110-1, 110-2, 110-3, etc.

As previously discussed, cache management resource 140 includes buffer 181. Cache management resource 140 stores newly received segments of content received between time T7 and time T8 in the buffer 181. Accordingly, buffer 181 stores newly received segments of content 110-1-8, 110-2-8, 110-3-8, etc.

Cache management resource 140 temporarily stores prior received segments of content in cache repository 180. For example, the cache management resource 140 stores and makes available segments of content 110-1-7, 110-2-7, 110-3-7, etc., in cache repository 180 for each of the different streams of content 110-1, 110-2, 110-3, etc., as shown.

In one embodiment, the cache management resource 140 makes the segments of content stored in the cache repository 180 available to the mobile communication devices in the network environment during a window of time between T7 and T8. Thus, as the cache management resource 140 receives next segments of content from the different streams of content 110, the cache management resource 140 makes the prior received segments of content 110-1-7, 110-2-7, 110-3-7, etc., stored in the cache repository 180 temporarily available to the mobile communication devices until the cache management resource 140 overwrites the segments of content 110-1-7, 110-2-7, 110-3-7, etc., in the cache repository 180 with newly received segments of content 110-1-8, 110-2-8, 110-3-8, etc., as shown in FIG. 10.

Figure 10:
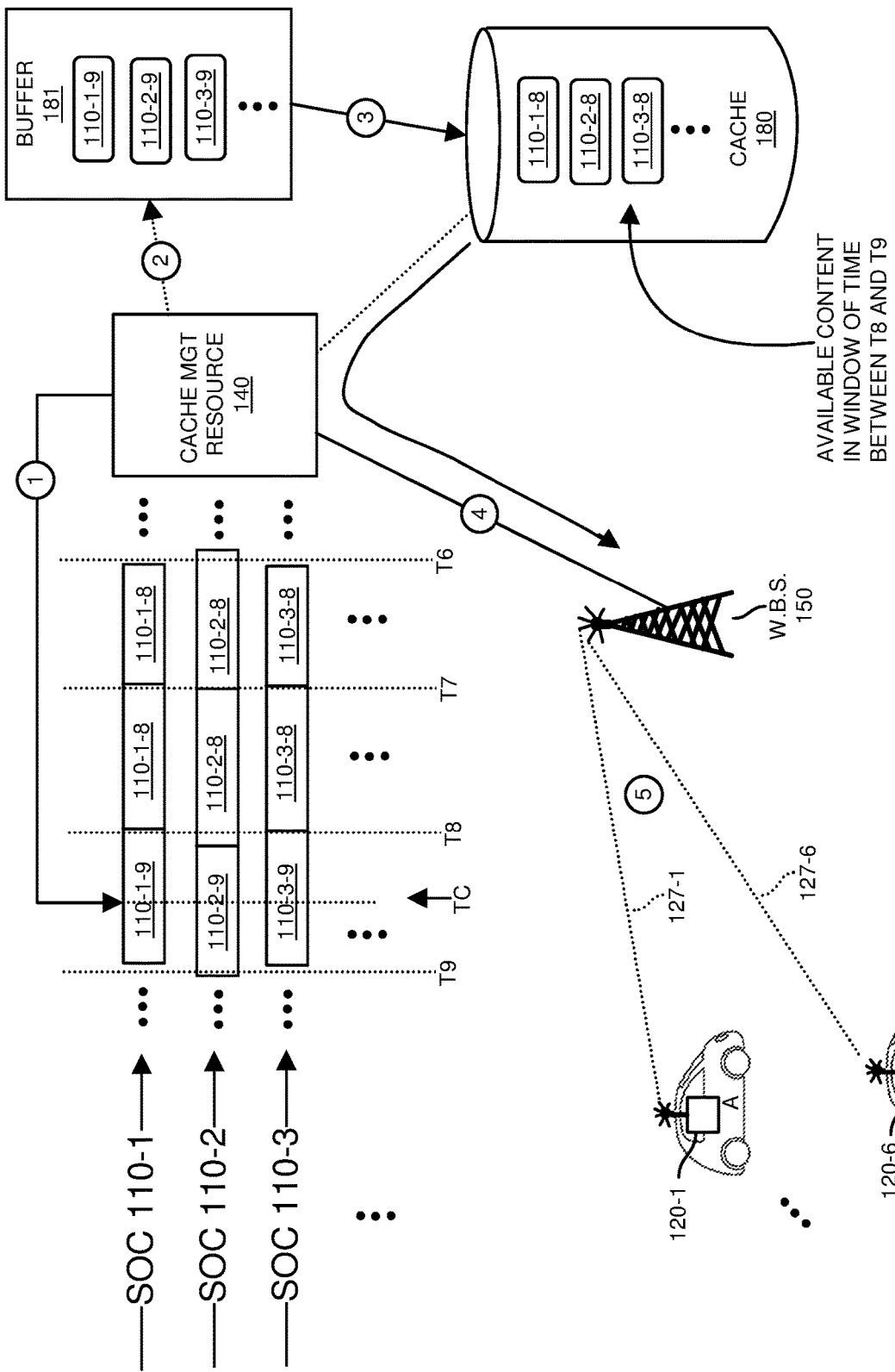

FIG. 10 is an example diagram illustrating distribution of content according to embodiments herein.

In this example embodiment, the cache management resource 140 associated with the wireless base station 150 continues to tune to one or more streams of content 110-1, 110-2, 110-3, etc.

As previously discussed, cache management resource 140 includes buffer 181. Cache management resource 140 stores currently received segments of content received between time T8 and time T9 in the buffer 181. Accordingly, buffer 181 stores newly received segments of content 110-1-9, 110-2-9, 110-3-9, etc.

Cache management resource 140 temporarily stores prior received segments of content in cache repository 180. For example, the cache management resource 140 stores segments of content 110-1-8, 110-2-8, 110-3-8, etc., in cache repository 180 for each of the different streams of content 110-1, 110-2, 110-3, etc., as shown.

In one embodiment, the cache management resource 140 makes the segments of content stored in the cache repository 180 available to the mobile communication devices in the network environment during a window of time such as between time T8 and T9. Thus, as the cache management resource 140 receives next segments of content 110-1-8, 110-2-8, 110-3-8, etc., from the different streams of content 110 during T8 and T9, the cache management resource 140 makes the prior received segments of content stored in the cache repository 180 temporarily available to the mobile communication devices until the cache management resource 140 overwrites the segments of content 110-1-8, 110-2-8, 110-3-8, etc., in the cache repository 180 with segments of content 110-1-9, 110-2-9, 110-3-9, etc.

Figure 11:
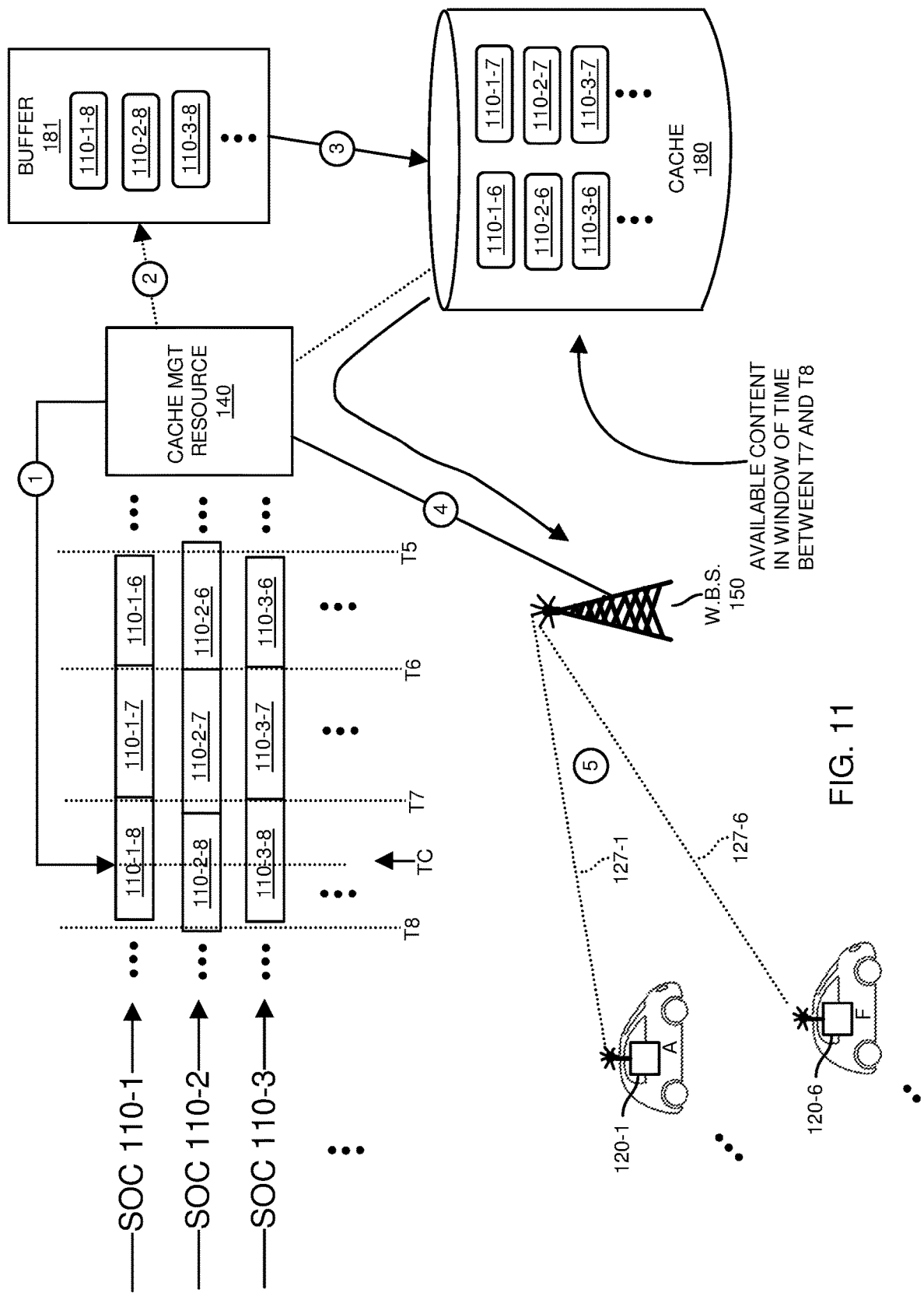

FIG. 11 is an example diagram illustrating distribution of content according to embodiments herein.

In this example embodiment, the cache management resource 140 associated with the wireless base station 150 continues to tune to one or more streams of content 110-1, 110-2, 110-3; etc.

As previously discussed, cache management resource 140 includes buffer 181. Cache management resource 140 stores currently received segments of content received between time T7 and time T8 in the buffer 181. Accordingly, buffer 181 stores newly received segments of content 110-1-8, 110-2-8, 110-3-8, etc.

As previously discussed, cache management resource 140 temporarily stores prior received segments of content in cache repository 180. However, in this example embodiment, the cache management resource 140 stores a larger window of cached content segments.

For example, the cache management resource stores segments of content 110-1-6, 110-2-6, 110-3-6, 110-1-7, 110-2-7, 110-3-7, etc., in cache repository 180 for each of the different streams of content 110-1, 110-2, 110-3, etc., as shown. In such an instance, the mobile communication devices 120 in network environment 100 are able to retrieve cached segments of content received between time T5 and T7.

In one embodiment, the cache management resource 140 makes the segments of content stored in the cache repository 180 available to the mobile communication devices in the network environment during a window of time such as between time T7 and T8. Thus, as the cache management resource 140 receives next segments of content 110-1-8, 110-2-8, 110-3-8, etc., from the different streams of content 110 during T7 and T8, the cache management resource 140 makes the prior received segments of content stored in the cache repository 180 temporarily available to the mobile communication devices. Upon completion of receiving segments of content 110-1-8, 110-2-8, 110-3-8, etc., the cache management resource 140 overwrites the segments of content 110-1-6, 110-2-6, 110-3-6, etc., in the cache repository 180 with segments of content 110-1-8, 110-2-8, 110-3-8, etc., as shown in FIG. 12.

Figure 12:
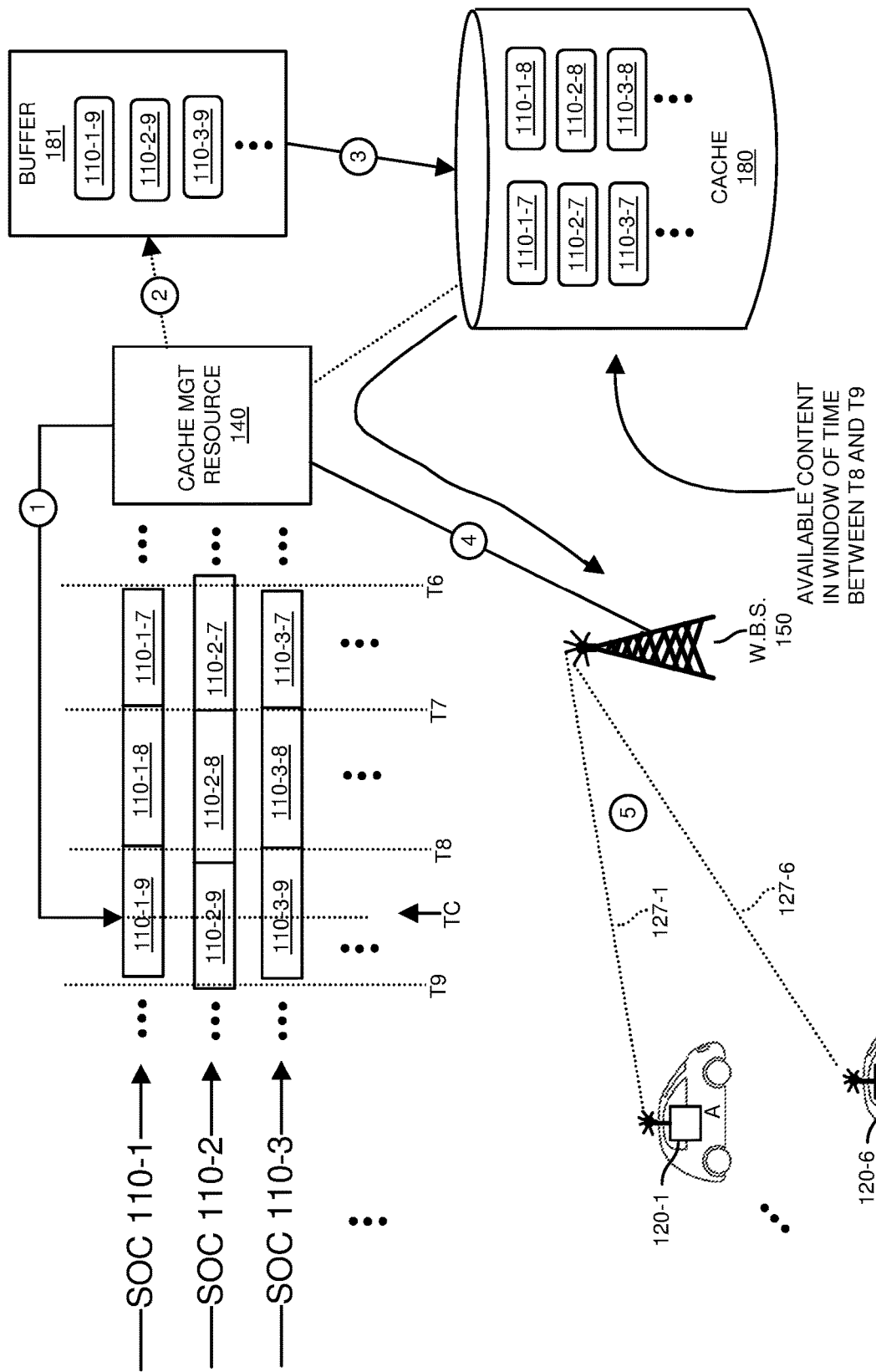

FIG. 12 is an example diagram illustrating distribution of content according to embodiments herein.

In this example embodiment, the cache management resource 140 associated with the wireless base station 150 continues to tune to one or more streams of content 110-1, 110-2, 110-3, etc.

As previously discussed, cache management resource 140 includes buffer 181. Cache management resource 140 stores currently received segments of content received between time T8 and time T9 in the buffer 181. Accordingly, buffer 181 stores newly received segments of content 110-1-9, 110-2-9, 110-3-9, etc.

As previously discussed, cache management resource 140 temporarily stores prior received segments of content in cache repository 180. However, in this example embodiment, the cache management resource 140 stores a larger window of cached content segments.

For example, the cache management resource stores segments of content 110-1-7, 110-2-7, 110-3-7, . . . , 110-1-8, 110-2-8, 110-3-8, etc., in cache repository 180 for each of the different streams of content 110-1, 110-2, 110-3, etc., as shown. In such an instance, the mobile communication devices 120 in network environment 100 are able to retrieve cached segments of content received between time T6 and T8.

In one embodiment, the cache management resource 140 makes the segments of content stored in the cache repository 180 available to the mobile communication devices in the network environment during a window of time such as between time T8 and T9. Thus, as the cache management resource 140 receives next segments of content 110-1-9, 110-2-9, 110-3-9, etc., from the different streams of content 110 during T8 and T9, the cache management resource 140 makes the prior received segments of content stored in the cache repository 180 temporarily available to the mobile communication devices. Upon completion of receiving segments of content 110-1-9, 110-2-9, 110-3-9, etc., the cache management resource 140 overwrites the segments of content 110-1-7, 110-2-7, 110-3-7, etc., in the cache repository 180 with segments of content 110-1-9, 110-2-9, 110-3-9, etc.

Figure 13:
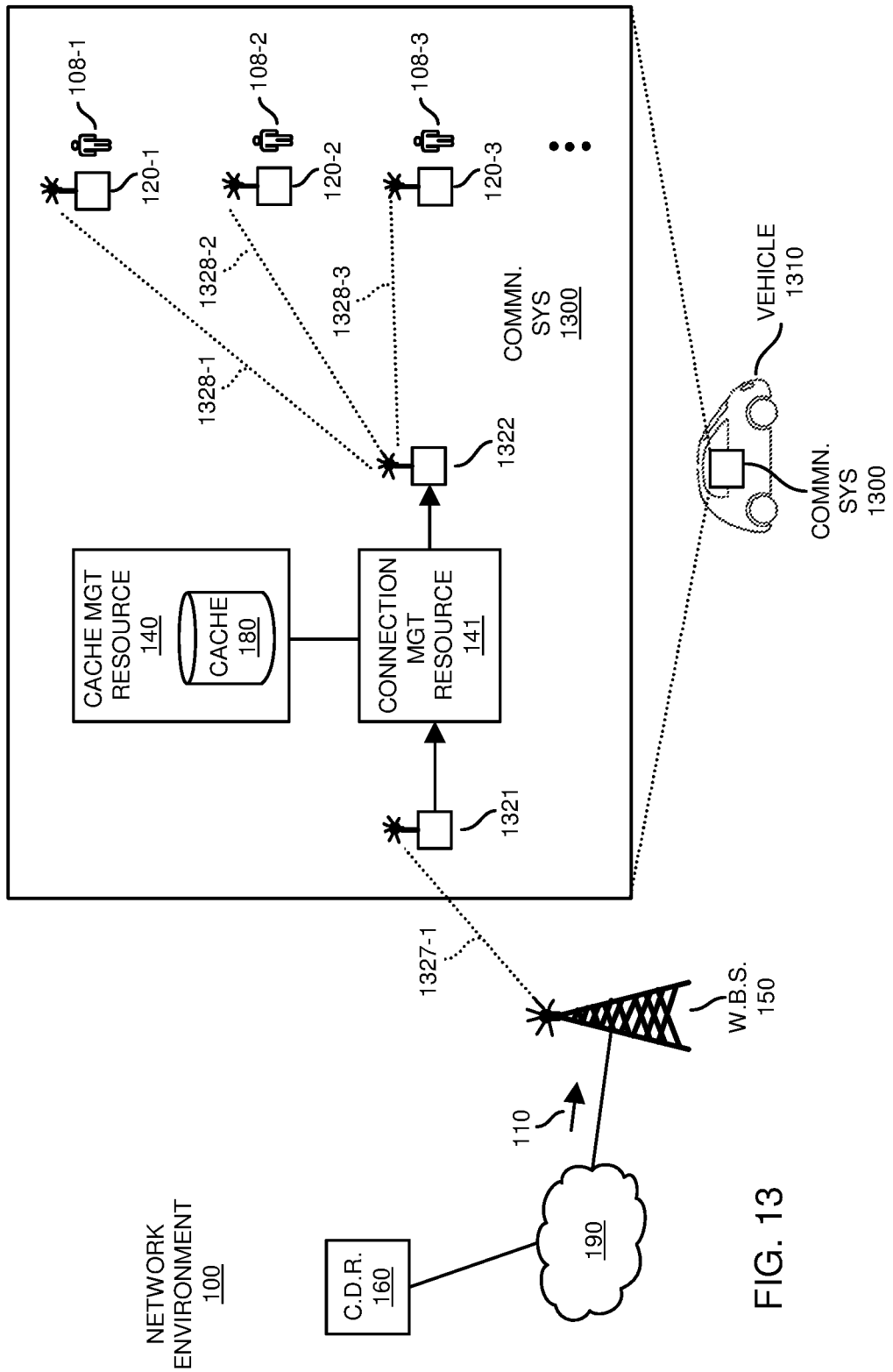
FIGS. 13-15 illustrate implementing a cache management resource in a multi-passenger vehicle according to embodiments herein.

FIG. 13 is an example diagram illustrating implementation of a cache management resource in a vehicle according to embodiments herein.

In this example embodiment, the network environment 100 includes content distribution resource 160, network 190, and wireless base station 150 as previously discussed. However, the communication system 1300 including cache management resource 140, connection management resource 140, and corresponding mobile communication devices 120-1, 120-2, 120-3, etc., is disposed in or on a respective vehicle 1310 (such as a bus, train, etc.). Users 108 are passengers of the multi-passenger vehicle 1310.

In this example embodiment, communication system 1300 includes wireless interface 1321 and wireless interface 1322.

During operation, the wireless interface 1321 establishes a respective wireless communication link 1327-1 with the wireless base station 150. In the wireless communication link 1327-1, the cache management resource 140 receives one or more streams of content 110 from the wireless base station.

In a similar manner as discussed with respect to FIGS. 8-12, the cache management resource 140 temporarily stores one or more segments of content associated with each of the different streams of content for subsequent distribution to one or more mobile communication devices 120 residing on the vehicle 1310. During operation, the cache management resource 140 temporarily stores streams of content received over a wireless communication link 1327-1 from the wireless base station 150.

Via the wireless interface 1322, the cache management resource 140 initiates distribution of the temporarily stored segments of content to the mobile communication devices 120. A more specific detailed diagram of caching and distributing respective segments of content is shown in FIG. 14.

Figure 14:
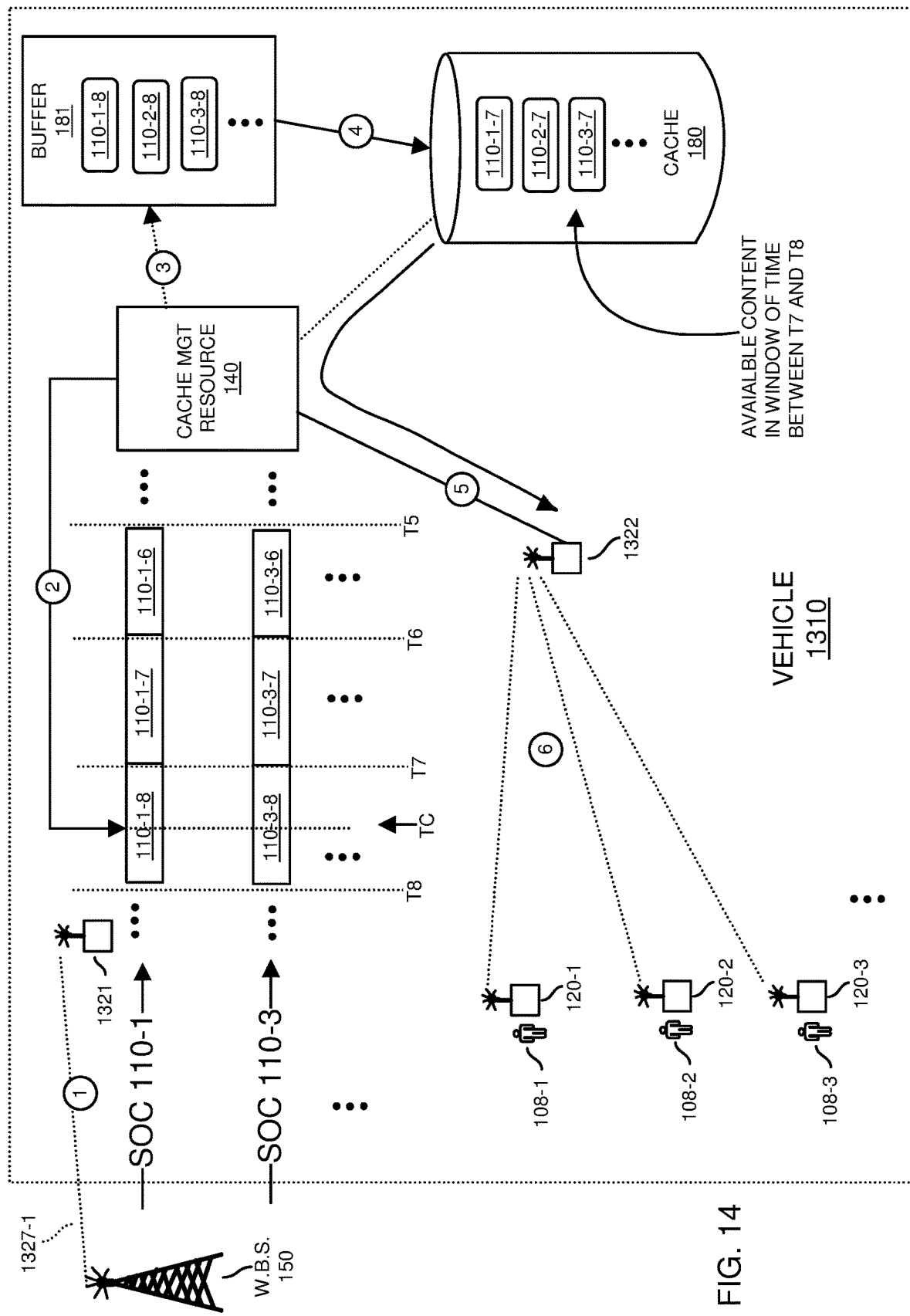

FIG. 14 is an example diagram illustrating temporary caching of segments of content for subsequent distribution to multiple mobile communication devices according to embodiments herein.

In this example embodiment, each of the one or more mobile communication devices operated by respective users 108 on multi-passenger vehicle 1310 communicate with the wireless interface 1322 to retrieve temporary available segments of content stored in cache repository 108.

In one embodiment, the cache management resource 140 buffers and stores segments of content depending upon which of multiple streams of content are selected by the corresponding users 108.

For example, assume that the user 108-1 operating mobile communication device 120-1 transmits a wireless request through the wireless interface 1322 to the cache management resource 140 for retrieval of corresponding stream of content 110-1 (such as a first title of video content). In such an instance, the cache management resource 140 receives the respective request and communicates over the wireless communication link 1327-1 to the wireless base station to receive the stream of content 110-1. The cache management resource 140 receives the respective segments of content during the different time frames such as between time T5 and T6, between T6 and T7, between T7 and T8, etc., in a manner as previously discussed.

Assume further that the user 108-1 operating mobile communication device 120-2 transmits a wireless request to the wireless interface 1322 for retrieval of corresponding stream of content 110-2 (such as a second title of video content). In such an instance, the cache management resource 140 receives the respective request and communicates over the wireless communication link 1327-1 to the wireless base station 150 to receive the stream of content 110-2. The cache management resource 140 receives the respective segments of content during the different time frames.

FIG. 14 is an example diagram illustrating caching and distribution of content on a multi-passenger vehicle according to embodiments herein.

In a similar manner as previously discussed, the cache management resource 140 stores segments of content received between time T7 and T8 in buffer. Each of the mobile communication devices 120 and corresponding users 108 aboard the multi-passenger vehicle 310 are able to retrieve the different segments of content stored in cache 180.

For example, during window time between time T7 and T8, assume that the mobile communication device 120-1 and mobile communication device 120-3 each send a different request at a different time during this window of time (between T7 and T8) to retrieve the segment of content 110-1-7 for playback on a respective display screen of the mobile communication device. In such an instance, via the wireless interface 1322, the cache management resource 140 wirelessly communicates the requested segment of content 110-1-7 to each of the requesting mobile communication devices aboard the multi-passenger vehicle 1310.

Further, during window time between time T7 and T8, assume that the mobile communication device 120-2 and mobile communication device 120-4 each send a different request at different times during this window of time (between T7 and T8) to retrieve the segment of content 110-2-7 for playback on a respective display screen of the mobile communication device. In such an instance, via the wireless interface 1322, the cache management resource 140 wirelessly communicates the requested segment of content 110-2-7 to each of the requesting mobile communication devices aboard the multi-passenger vehicle 1310.

Figure 15:
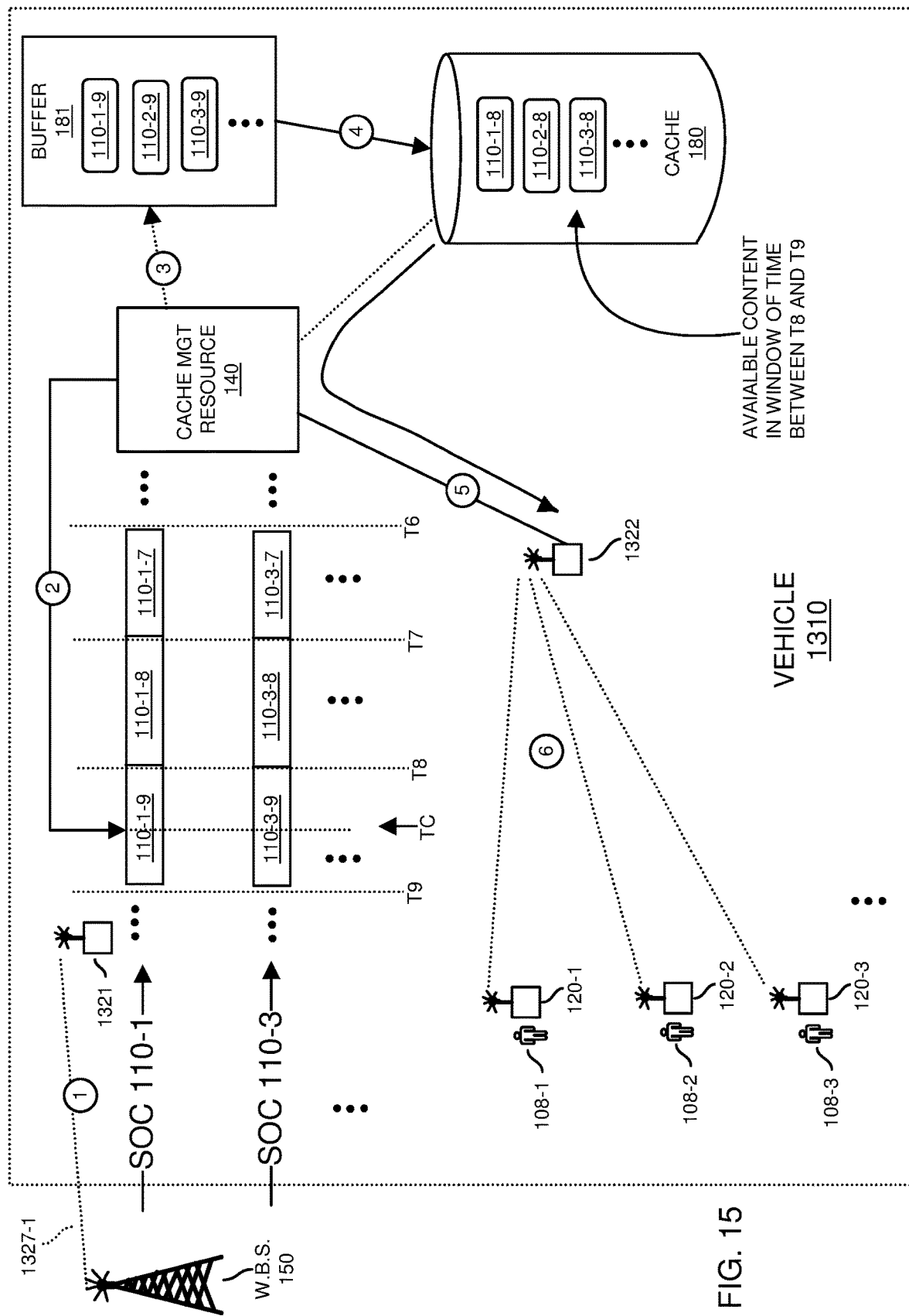

Subsequent to the cache management resource 140 completing reception of the segments of content 110-1-8, 110-3-8, etc., the cache management resource 140 overwrites the segments of content 110-1-7, 110-3-7, etc., with the segments of content 110-1-8, 110-3-A, etc., from the buffer 181 as shown in FIG. 15.

FIG. 15 is an example diagram illustrating caching and distribution of content on a multi-passenger vehicle according to embodiments herein.

In a similar manner as previously discussed, the cache management resource 140 stores segments of content received between time T8 and T9 in buffer. Each of the mobile communication devices 120 and corresponding users 108 aboard the multi-passenger vehicle 310 are able to retrieve the different segments of content stored in cache 180.

For example, during window time between time T8 and T9, assume that the mobile communication device 120-1 and mobile communication device 120-3 each send a different request at a different time during this window of time (between T8 and T9) to retrieve the segment of content 110-1-8 for playback on a respective display screen of the mobile communication device. In such an instance, via the wireless interface 1322, the cache management resource 140 wirelessly communicates the requested segment of content 110-1-8 to each of the requesting mobile communication devices aboard the multi-passenger vehicle 1310.

Further, during window time between time T8 and T9, assume that the mobile communication device 120-2 and mobile communication device 120-4 each send a different request at different times during this window of time (between T8 and T9) to retrieve the segment of content 110-2-8 for playback on a respective display screen of the mobile communication device. In such an instance, via the wireless interface 1322, the cache management resource 140 wirelessly communicates the requested segment of content 110-2-8 to each of the requesting mobile communication devices aboard the multi-passenger vehicle 1310.

Subsequent to the cache management resource 140 completing reception of the segments of content 110-1-9, 110-3-9, etc., the cache management resource 140 overwrites the segments of content 110-1-8, 110-3-8, etc., with the segments of content 110-1-9, 110-3-9, etc., from the buffer 181.

Figure 16:
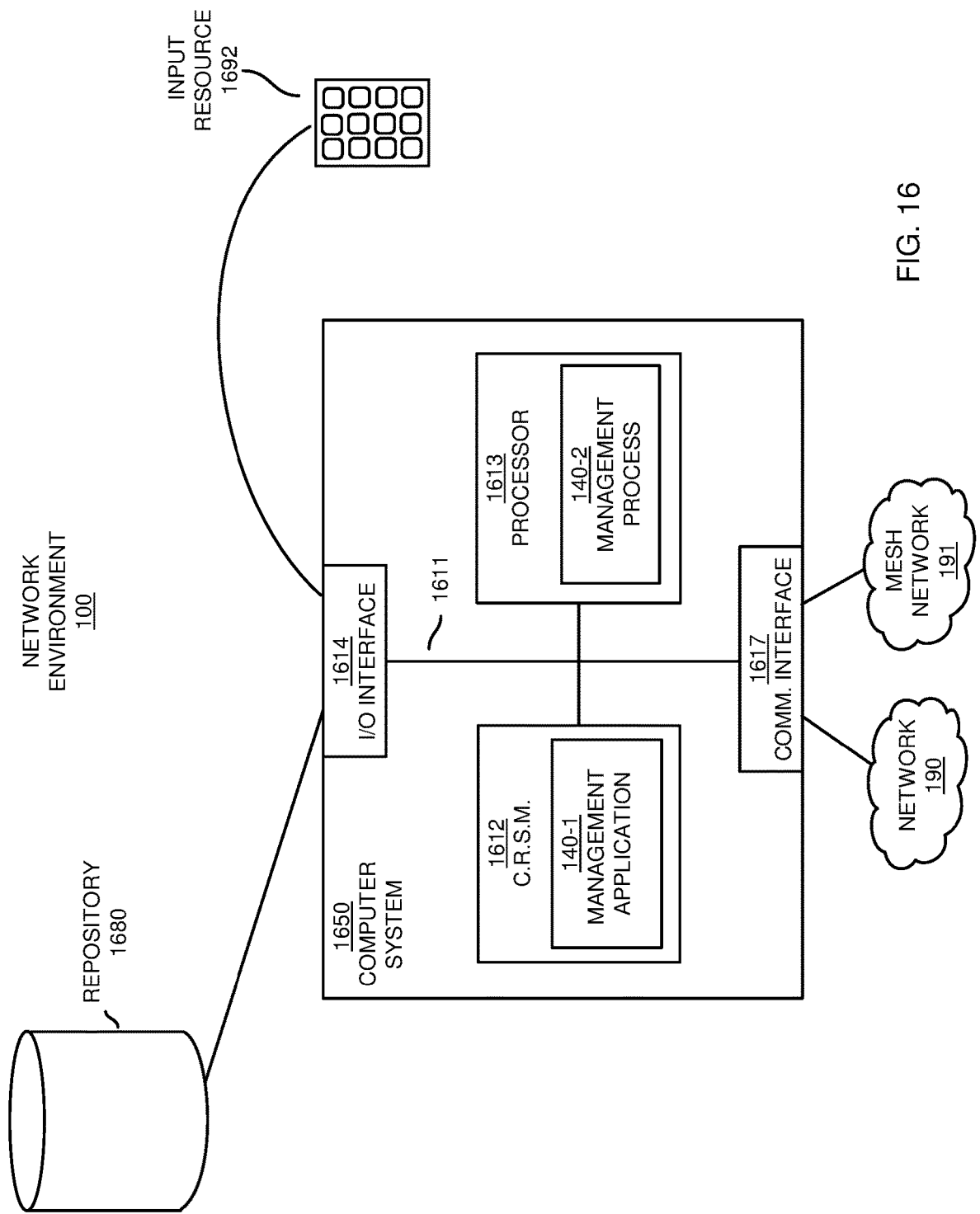
FIG. 16 is an example diagram illustrating example computer architecture operable to execute one or more operations according to embodiments herein.

FIG. 16 is an example block diagram of a computer system for implementing any of the operations as previously discussed according to embodiments herein.

Any of the resources (such as cache management resource 140, connection management resource 141, wireless base station 150, each of the mobile communication devices 120, etc.) as discussed herein can be configured to include computer processor hardware and/or corresponding executable instructions to carry out the different operations as discussed herein.

As shown, computer system 1650 of the present example includes interconnect 1611 coupling computer readable storage media 1612 such as a non-transitory type of media (which can be any suitable type of hardware storage medium in which digital information can be stored and or retrieved), a processor 1613 (computer processor hardware), I/O interface 1614, and a communications interface 1617.

I/O interface(s) 1614 supports connectivity to repository 1680 and input resource 1692.

Computer readable storage medium 1612 can be any hardware storage device such as memory, optical storage, hard drive, floppy disk, etc. In one embodiment, the computer readable storage medium 1612 stores instructions and/or data.

As shown, computer readable storage media 1612 can be encoded with management application 140-1 (e.g., including instructions) in a respective wireless station to carry out any of the operations as discussed herein.

During operation of one embodiment, processor 1613 accesses computer readable storage media 1612 via the use of interconnect 1611 in order to launch, run, execute, interpret or otherwise perform the instructions in management application 140-1 stored on computer readable storage medium 1612. Execution of the management application 140-1 produces management process 140-2 to carry out any of the operations and/or processes (associated with the cache management resource 140, cache management resource 141, mobile communication devices 120, etc.) as discussed herein.

Those skilled in the art will understand that the computer system 1650 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, a personal computer system, a wireless device, a wireless base station, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1650 may reside at any location or can be included in any suitable resource in any network environment to implement functionality as discussed herein.

Functionality supported by the different resources will now be discussed via flowcharts in FIGS. 17-18. Note that the steps in the flowcharts below can be executed in any suitable order.

Figure 17:
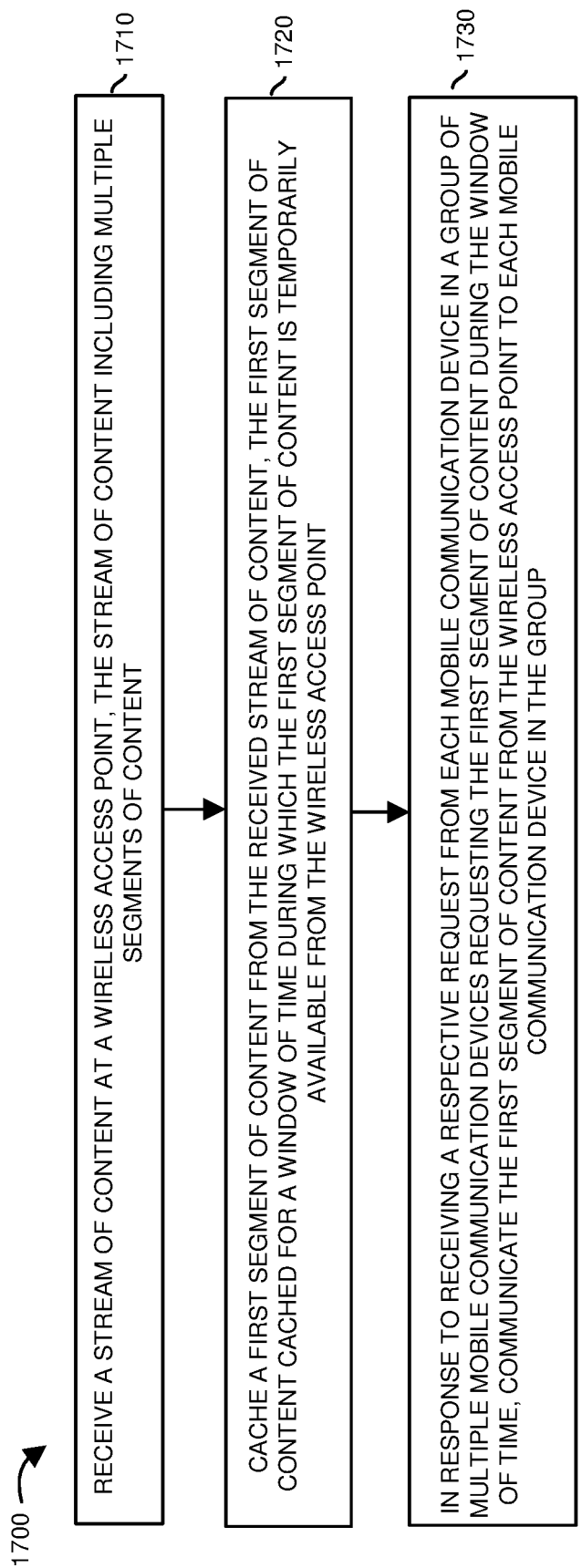
FIGS. 17-18 are example diagrams illustrating methods according to embodiments herein.

FIG. 17 is a flowchart 1700 illustrating an example method according to embodiments herein. Note that there will be some overlap with respect to concepts as discussed above.

In processing operation 1710, the cache management resource 140 associated with the wireless base station 150 receives a stream of content 110; the stream of content 110 includes multiple segments of content.

In processing operation 1720, the cache management resource 140 caches a first segment of content from the received stream of content 110. In one embodiment, the first segment of content is cached for a window of time during which the first segment of content is temporarily available from the wireless base station 150.

In processing operation 1730, in response to each of the mobile communication devices in a group requesting the first segment of content during the window of time (such as from another mobile communication device, cache management resource 140, or wireless base station 150), the communication system as described herein distributes the first segment to each mobile communication device in the group.

As previously discussed, in one embodiment, the root node (such as mobile communication device 120-1 in FIG. 1) is configured to receive the first segment of content from the wireless base station 150 and then communicate copies of the first segment of content downstream to the other mobile communication devices in the message network. Alternatively, the root node (mobile communication device 120-1) is configured to convey requests for the first segment of content to the wireless base station 150 that, in turn, communicates a copy of the first segment of content through the respective root node (mobile communication device 120-1) to each requesting mobile communication device.

Figure 18:
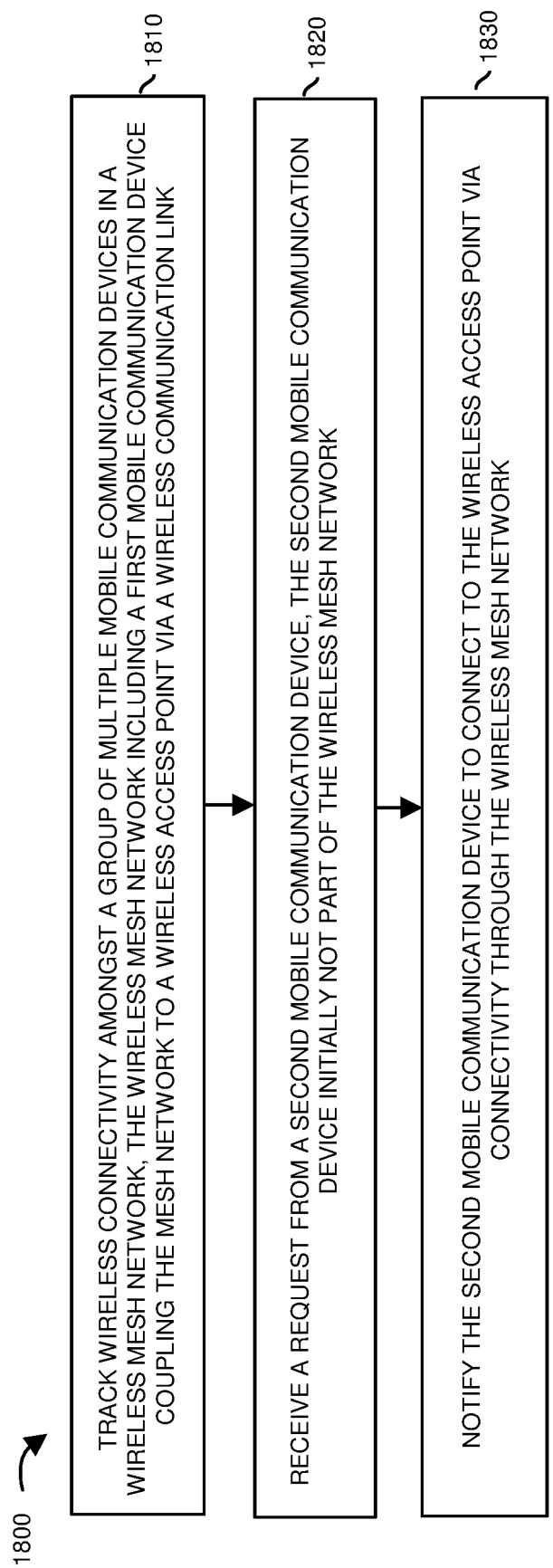

FIG. 18 is a flowchart 1800 illustrating an example method according to embodiments. Note that there will be some overlap with respect to concepts as discussed above.

In processing operation 1810, the connection management resource 141 tracks wireless connectivity amongst a group of multiple mobile communication devices 120 in a wireless mesh network. The wireless mesh network includes a first mobile communication device 120-1 coupling the mesh network (such as mobile communication devices 120-1, 120-2, 120-3, and 120-4) to a wireless base station 150 via a wireless communication link 127-1.

In processing operation 1820, the connection management resource 141 receives a request from a second mobile communication device 120-5 to retrieve content. The second mobile communication device 120-5 initially is not part of the wireless mesh network.

In processing operation 1830, the connection management resource 141 notifies the second mobile communication device 120-5 to connect to the wireless base station 150 via connectivity through the mobile communication device 120-6 in the wireless mesh network including mobile communication device 120-6 and 120-7 in FIG. 1.

Note again that techniques herein are well suited to facilitate temporary caching of segments of content at one or more locations in a network such as at a wireless base station 150, cache management resource 140, mobile communication device 120, etc. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
 receiving a stream of content including multiple segments of content;
 caching a first segment of content from the received stream of content in a cache, the first segment of content cached in the cache for a window of time during which the first segment of content is temporarily available for retrieval from a first wireless base station;
 in response to receiving a first request from a first mobile communication device requesting retrieval of the first segment of content during the window of time, wirelessly communicating the first segment of content from the first wireless base station to the first mobile communication device; and
 subsequent to expiration of the window of time, updating the cache to store a second segment of content received from the stream of content, the updating of the cache including replacement of the first segment of content with the second segment of content, the second segment of content received after the first segment of content; and
 wherein the first mobile communication device is a root node in wireless communication with a second mobile communication device.

2. The method as in claim 1 further comprising:
 at the first wireless base station, tuning to receive the stream of content in response to receiving the first request for the first segment of content from the first mobile communication device; and
 wherein communicating the first segment of content includes: in response to receiving the first request for the first segment of content from the first mobile communication device, communicating the first segment of content over a wireless communication link from the first wireless base station to the first mobile communication device.

3. The method as in claim 1 further comprising:
 from the first mobile communication device, communicating the first segment of content to the second mobile communication device in response to the second mobile communication device requesting the first segment of content from the first mobile communication device, the first mobile communication device temporarily caching the first segment of content for at least a portion of the window of time.

4. The method as in claim 1 further comprising:
 wherein the first mobile communication device communicates the first segment of content from the first mobile communication device to the second mobile communication device in response to the second mobile communication device transmitting a wireless message to the first mobile communication device requesting the first segment of content.

5. The method as in claim 1, wherein the first wireless base station resides on a multi-passenger vehicle, the first wireless base station in communication with a second wireless base station via a first wireless communication link, the method further comprising:
 at the first wireless base station, receiving the first segment of content over the first wireless communication link from the second wireless base station.

6. The method as in claim 5, wherein the first mobile communication device is operated by a first passenger of the multi-passenger vehicle, the second mobile communication device operated by a second passenger of the multi-passenger vehicle.

7. The method as in claim 1, wherein the window of time is a moving window of time; and
 wherein the cache stores two or fewer segments of content associated with the stream of content at any time.

8. The method as in claim 1, wherein the first segment of content is temporarily cached in the cache during the window of time until the second segment of content is received from the stream of content, the first segment of content transmitted in a first timeslot of a sequence of timeslots in which the first segment of content is transmitted, the second segment of content transmitted in a second timeslot of the sequence of timeslots, the second timeslot being a next timeslot in the sequence with respect to the first timeslot, the cache storing fewer than three segments of the content of the stream of content at any time.

9. The method as in claim 1 further comprising:
storing the first segment of content at the first mobile communication device; and
distributing the first segment of content from the first mobile communication device over a first wireless communication link to the second mobile communication device requesting the first segment of content.

10. The method as in claim 9 further comprising:
storing the first segment of content at the second mobile communication device; and
providing a third mobile communication device wireless access to the first segment of content stored in the second mobile communication device.

11. The method as in claim 1 further comprising:
producing wireless connectivity information indicating wireless connectivity of multiple mobile communication devices in a wireless mesh network, the multiple mobile communication devices including the first mobile communication device, the wireless connectivity information defining connectivity between the multiple mobile communication devices and the first wireless base station.

12. The method as in claim 1 further comprising:
providing the second mobile communication device wireless access to the first segment of content from the first mobile communication device via wireless connectivity between the first mobile communication device and the second mobile communication device.

13. The method as in claim 1 further comprising:
via first wireless connectivity between the first mobile communication device and a first mesh network of multiple mobile communication devices, providing the first mesh network of multiple mobile communication devices access to the first segment of content; and
via second wireless connectivity between a third mobile communication device and a second mesh network of multiple mobile communication devices, providing the second mesh network of multiple mobile communication devices access to the first segment of content, the third mobile communication device wirelessly connected to the first wireless base station.

14. The method as in claim 1, wherein the first segment of content is no longer available from the cache after the replacement.

15. The method as in claim 1, wherein the first segment of content is available from the cache in a first timeslot and is no longer available in a second timeslot; and
wherein the second segment of content is available from the cache in the second timeslot.

16. A method comprising:
receiving a stream of content including multiple segments of content;
caching a first segment of content from the received stream of content in a cache, the first segment of content cached in the cache for a window of time during which the first segment of content is temporarily available for retrieval from a first wireless base station;
in response to receiving a first request from a first mobile communication device requesting retrieval of the first segment of content during the window of time, wirelessly communicating the first segment of content from the first wireless base station to the first mobile communication device; and
subsequent to expiration of the window of time, updating the cache to store a second segment of content received from the stream of content, the updating of the cache including replacement of the first segment of content with the second segment of content, the second segment of content received after the first segment of content;
the method further comprising: producing wireless connectivity information indicating wireless connectivity of multiple mobile communication devices in a wireless mesh network, the multiple mobile communication devices including the first communication device, the wireless connectivity information defining connectivity between the multiple mobile communication devices and the first wireless base station;
wherein the wireless connectivity information indicates that the first mobile communication device is a root mobile communication device in communication with the first wireless base station; and
wherein the first mobile communication device provides a group of mobile communication devices wireless access to the first segment of content via wireless connectivity between the first mobile communication device and the group of mobile communication devices.

17. A method comprising:
receiving a stream of content including multiple segments of content;
caching a first segment of content from the received stream of content in a cache, the first segment of content cached in the cache for a window of time during which the first segment of content is temporarily available for retrieval from a first wireless base station;
in response to receiving a first request from a first mobile communication device requesting retrieval of the first segment of content during the window of time, wirelessly communicating the first segment of content from the first wireless base station to the first mobile communication device; and
subsequent to expiration of the window of time, updating the cache to store a second segment of content received from the stream of content, the updating of the cache including replacement of the first segment of content with the second segment of content, the second segment of content received after the first segment of content;
the method further comprising:
establishing wireless connectivity between the first wireless base station and a second mobile communication device; and
initiating a connection switchover of wirelessly connecting the second mobile communication to the first mobile communication device instead of wirelessly connecting the second mobile communication device to the first wireless base station, the second mobile communication device operative to receive the stream of content from the first mobile communication device after the connection switchover.

18. The method as in claim 17 further comprising:
processing wireless connectivity information to identity that the first mobile communication device has an ability to provide the second mobile communication device the stream of content, the wireless connectivity information defining mobile wireless mesh network connectivity amongst multiple mobile communication devices and the first wireless base station.

19. The method as in claim 18, wherein the wireless connectivity information tracks a respective location of each of the multiple mobile communication devices; and
initiating the connection switchover of the second mobile communication device from the first wireless base station to the first mobile communication device based on a location of the second mobile communication device with respect to the first mobile communication device.

20. A method comprising:
receiving a stream of content including multiple segments of content;
caching a first segment of content from the received stream of content in a cache, the first segment of content cached in the cache for a window of time during which the first segment of content is temporarily available for retrieval from a first wireless base station;
in response to receiving a first request from a first mobile communication device requesting retrieval of the first segment of content during the window of time, wirelessly communicating the first segment of content from the first wireless base station to the first mobile communication device; and
subsequent to expiration of the window of time, updating the cache to store a second segment of content received from the stream of content, the updating of the cache including replacement of the first segment of content with the second segment of content, the second segment of content received after the first segment of content;
the method further comprising:
via first wireless connectivity between the first mobile communication device and a first mesh network of multiple mobile communication devices, providing the first mesh network of multiple mobile communication devices access to the first segment of content;
via second wireless connectivity between a second mobile communication device and a second mesh network of multiple mobile communication devices, providing the second mesh network of multiple mobile communication devices access to the first segment of content, the second mobile communication device wirelessly connected to the first wireless base station; and
switching over connectivity of the first mobile communication device from the first wireless base station to the second mesh network.

21. A method comprising:
receiving a stream of content including multiple segments of content;
caching a first segment of content from the received stream of content in a cache, the first sediment of content cached in the cache for a window of time during which the first segment of content is temporarily available for retrieval from a first wireless base station;
in response to receiving a first request from a first mobile communication device requesting retrieval of the first segment of content during the window of time, wirelessly communicating the first segment of content from the first wireless base station to the first mobile communication device; and
subsequent to expiration of the window of time, updating the cache to store a second segment of content received from the stream of content, the updating of the cache including replacement of the first segment of content with the second segment of content, the second segment of content received after the first segment of content;
creating wireless connectivity information indicating that the first mobile communication device is a root mobile communication device in communication with the first wireless base station; and
wherein the connectivity information indicates that the first mobile communication device provides a group of mobile communication devices in a first mesh network wireless access to the stream of content.

22. The method as in claim 21, wherein the connectivity information indicates that the first mobile communication device supports a hierarchy associated with the first mesh network in which: i) the first mobile communication device is the root mobile communication device receiving segments of the stream of content from the first wireless base station, ii) a second mobile communication device in the first mesh network is in wireless communication with the first mobile communication device to receive segments of the stream of content, and iii) a third mobile communication device in the first mesh network is in wireless communication with the second mobile communication device to receive segments of the stream of content.

23. The method as in claim 22 further comprising:
modifying the connectivity information in response to the first mobile communication device moving to a new location, the modified connectivity information indicating that the second mobile communication device is the root mobile communication device in the first mesh network instead of the first mobile communication device.

24. The method as in claim 23, wherein the modified wireless connectivity information indicates that the first mobile communication device is part of a second mesh network in which the first mobile communication device is wirelessly connected to a fourth mobile communication device, the fourth mobile communication device being a root mobile communication device in the second mesh network wirelessly connected to the first wireless base station.

25. The method as in claim 24, wherein the modified wireless connectivity information further indicates that a fifth mobile communication device is wirelessly connected to the fourth mobile communication device, the fourth mobile communication device having access to the stream of content through the fourth mobile communication device.

26. The method as in claim 25, wherein the first segment of content is available from the cache for distribution to the first mesh network and the second mesh network in a first timeslot and is no longer available in a second time slot; and
wherein the second segment of content is available from the cache for distribution to the first mesh network and the second mesh network in a second timeslot.

* * * * *

UNITED STATES PATENT AND TRADEMARK OFFICE
CERTIFICATE OF CORRECTION

PATENT NO. : 11,758,202 B2
APPLICATION NO. : 16/525483
DATED : September 12, 2023
INVENTOR(S) : Karim Ghessassi Page 1 of 1

It is certified that error appears in the above-identified patent and that said Letters Patent is hereby corrected as shown below:

In the Claims

Claim 16, Line 26, replace "first communication" with --first mobile communication--
Claim 21, Line 5, replace "sediment" with --segment--

Signed and Sealed this
Thirty-first Day of October, 2023

Katherine Kelly Vidal
*Director of the United States Patent and Trademark Office*